(12) United States Patent
Chapman et al.

(10) Patent No.: US 9,722,739 B2
(45) Date of Patent: Aug. 1, 2017

(54) MANAGING TIME OFFSET AND FREQUENCY DRIFT IN ASYNCHRONOUS DOCSIS REMOTE PHY NETWORK ENVIRONMENTS

(71) Applicant: CISCO TECHNOLOGY, INC., San Jose, CA (US)

(72) Inventors: John T. Chapman, Laguna Niguel, CA (US); Yi Tang, San Jose, CA (US); Lin Su, Shanghai (CN); Tong Liu, Acton, MA (US); Hang Jin, Plano, TX (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 177 days.

(21) Appl. No.: 14/685,403

(22) Filed: Apr. 13, 2015

(65) Prior Publication Data

US 2015/0295669 A1 Oct. 15, 2015

Related U.S. Application Data

(60) Provisional application No. 61/979,325, filed on Apr. 14, 2014.

(51) Int. Cl.
| | |
|---|---|
| *H04J 3/06* | (2006.01) |
| *H04L 5/00* | (2006.01) |
| *H04L 27/34* | (2006.01) |
| *H04B 3/54* | (2006.01) |
| *H04L 27/26* | (2006.01) |
| *H04L 12/801* | (2013.01) |
| *H04L 12/807* | (2013.01) |
| *H04L 12/28* | (2006.01) |

(52) U.S. Cl.
CPC .......... *H04L 5/0007* (2013.01); *H04B 3/542* (2013.01); *H04J 3/0667* (2013.01); *H04J 3/0673* (2013.01); *H04L 5/006* (2013.01); *H04L 12/2801* (2013.01); *H04L 27/2697* (2013.01); *H04L 27/3405* (2013.01); *H04L 27/345* (2013.01); *H04L 47/12* (2013.01); *H04L 47/27* (2013.01)

(58) Field of Classification Search
CPC .................................................. H04L 27/3405
See application file for complete search history.

(56) References Cited

U.S. PATENT DOCUMENTS

| | | | | |
|---|---|---|---|---|
| 4,815,109 | A * | 3/1989 | Kao ........................ | H04J 3/062 331/1 A |
| 6,744,697 | B2 | 6/2004 | Mitra et al. | |
| 7,085,287 | B1 | 8/2006 | Chapman | |
| 8,774,217 | B2 | 7/2014 | Chapman et al. | |
| 9,344,319 | B1 * | 5/2016 | Harrington ............. | H04L 27/34 |

(Continued)

*Primary Examiner* — Joseph Bednash
*Assistant Examiner* — Kevin Cunningham
(74) *Attorney, Agent, or Firm* — Patent Capital Group

(57) ABSTRACT

An example method for managing time offset and frequency drift in asynchronous Data Over Cable Service Interface Specification (DOCSIS) Remote Physical layer (R-PHY) network environments is provided and includes receiving, at a first hardware device, time synchronization message from a remote second hardware device in the DOCSIS R-PHY network, determining a time difference between a first clock at the first hardware device and a second clock at the second hardware device from the time synchronization message; and re-stamping an event message based on the time difference.

32 Claims, 11 Drawing Sheets

(56) References Cited

U.S. PATENT DOCUMENTS

| | | | |
|---|---|---|---|
| 2010/0002719 A1* | 1/2010 | Sowinski | H04J 3/1694 370/458 |
| 2013/0114480 A1* | 5/2013 | Chapman | H04L 5/1469 370/282 |
| 2014/0119732 A1* | 5/2014 | Stoneback | H04B 10/2575 398/66 |
| 2015/0222449 A1* | 8/2015 | Salinger | H04L 12/2801 370/419 |
| 2015/0295684 A1 | 10/2015 | Jin et al. | |
| 2015/0295746 A1 | 10/2015 | Chapman et al. | |
| 2015/0295838 A1 | 10/2015 | Liu et al. | |

* cited by examiner

MANAGING TIME OFFSET AND FREQUENCY DRIFT IN ASYNCHRONOUS DOCSIS REMOTE PHY NETWORK ENVIRONMENTS

CROSS-REFERENCE TO RELATED APPLICATION

This application claims the benefit of priority under 35 U.S.C. §119(e) to U.S. Provisional Application Ser. No. 61/979,325 entitled "REMOTE PHY ARCHITECTURE," filed Apr. 14, 2014, which is hereby incorporated by reference in its entirety.

TECHNICAL FIELD

This disclosure relates in general to the field of communications and, more particularly, to managing time offset and frequency drift in asynchronous Data Over Cable Service Interface Specification (DOCSIS) Remote Physical layer (R-PHY) network environments.

BACKGROUND

Driven by market evolution towards triple-play services, cable operators in emerging markets are seeking standardized and digital fiber-based solutions for economical and future proof access technologies. Much of the demand is driven by the need to provide higher bandwidth packet transport for Internet connectivity, video and voice services. DOCSIS is an international telecommunications standard that has evolved to permit addition of high-bandwidth data transfer to an existing cable TV (CATV) system utilizing Quadrature Amplitude Modulation (QAM) and/or Quadrature phase-shift keying (QPSK) Radio Frequency (RF) modulation. It is employed by many cable television operators to provide Internet access over their existing hybrid fiber-coaxial (HFC) infrastructure. Traditionally, the DOCSIS system is a Point-to-Multipoint communications system, the corresponding standards defining Media Access Control (MAC)/Physical Layer (PHY) standards associated with providing high speed data over a hybrid fiber coaxial (HFC) network and is not naturally applicable for digital fiber. However, Cisco® remote-PHY (R-PHY) technology bridges the gap, leveraging existing Internet Protocol (IP) technologies to deploy data over digital fiber, enabling two-way services over cable.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example method for managing time offset and frequency drift in asynchronous DOCSIS R-PHY network environments is provided and includes receiving, at a first hardware device, a time synchronization message from a remote second hardware device in a network, determining a time difference between a first clock at the first hardware device and a second clock at the second hardware device from the time synchronization message, and re-stamping an event message based on the time difference.

As used herein, a "time synchronization message" comprises a remote DOCSIS timing interface (R-DTI) message (e.g., messages received on a dedicated timing interface according to DOCSIS specifications), Institute of Electrical and Electronics Engineers (IEEE) 1588 time synchronization message, or other equivalent message that serves to communicate clock signals or time information. "Event message" refers to any message indicative of an event (e.g., transmit, receive, etc.); examples include time synchronization messages and Media Access Protocol (MAP) messages. In various embodiments, a "clock" comprises a hardware component generated generally by a phase locked loop (PLL) from a single crystal or other regular oscillator. Typically, the clock generates physical time (clock signals), which can track causality between events in the network. As used herein, the term "time difference" refers to a phase and/or frequency variance (e.g., time offset and frequency drift) between clock signals generated by separate and independent clocks.

Example Embodiments

Figure 1:
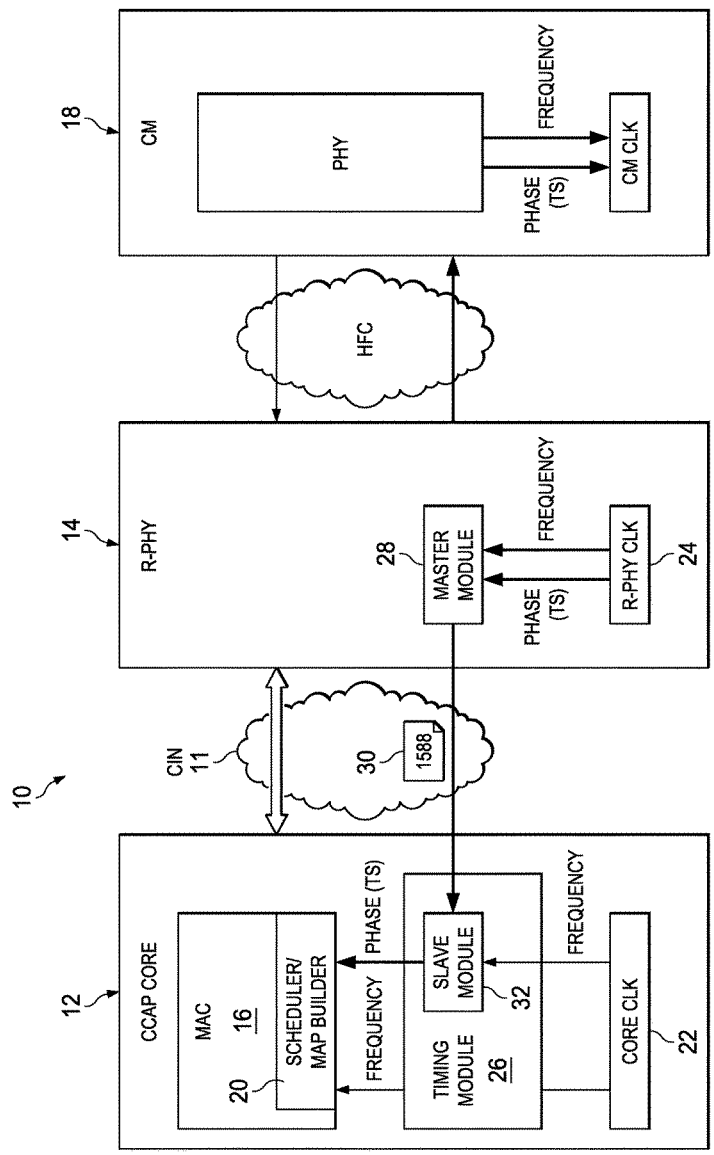
FIG. 1 is a simplified block diagram illustrating a communication system for managing time offset and frequency drift in asynchronous DOCSIS R-PHY network environments.

Turning to FIG. 1, FIG. 1 is a simplified block diagram illustrating a communication system 10 for managing time offset and frequency drift in asynchronous DOCSIS R-PHY network environments in accordance with one example embodiment. FIG. 1 illustrates a network 11 (indicated generally by an arrow) facilitating communication between a Converged Cable Access Platform (CCAP) core 12 and an R-PHY node 14, located in separate chassis (potentially in different physical locations) and connected over digital fiber (e.g., Ethernet link) over a converged interconnect network (CIN) or a suitable Ethernet based interface. CCAP core 12 and R-PHY node 14 together comprise a CCAP, which is typically a combination of a DOCSIS cable modem termination system (CMTS) and an edge QAM (EQAM). Media Access Control (MAC) and higher-layer functions of the CMTS stay in CCAP core 12, for example, as part of MAC 16. R-PHY node 14 connects to one or more cable modems (CM) 18 over coaxial cable of a hybrid fiber-coaxial (HFC) network.

To explain generally, communication system 10 uses channels to transmit signals (e.g., messages) between the CCAP and CM 18. Each channel is a separate path through which signals can flow. In cable modem systems, such as communication system 10, data service is delivered to the customer premises equipment through channels in a coaxial cable or optical fiber cable (or other suitable medium), with separate channels for upstream transmission (e.g., towards CCAP core 12) and downstream transmission (e.g., away from CCAP core 12). When CCAP core 12 receives signals from CM 18, it converts the signals into Internet Protocol (IP) packets, which are then sent to an IP router for transmission across the Internet. The downstream signals from CCAP core 12 to CM 18 are modulated for transmission across the cable to CM 18.

In R-PHY architectures, for example, as in embodiments of communication system 10, communication channels between CCAP core 12 and R-PHY node 14 comprise IP transmissions, called pseudowires (PW). Communication signals received at R-PHY node 14 from CMs 18 across the HFC network are converted into PWs at R-PHY node 14 and transmitted to CCAP core 12; likewise, PWs transmitted from CCAP core 12 to R-PHY node 14 are converted at R-PHY node 14 into communication signals for propagation across the HFC network.

In typical cable modem systems, the upstream channel is characterized by many CMs 18 transmitting to CCAP core 12. Because a number of CMs 18 share a single upstream transmission channel, an arbitrated mechanism is used to assure each modem of opportunities to transmit. That all CMs share a common notion of time, with themselves and their controlling CMTS, makes cooperation possible. Timing is important in network 11 for that reason, and also when dealing with microsecond timing calculations of DOCSIS transport. DOCSIS Timing Interface (DTI) standards provide for a master (e.g., root) clock at 10.24 MHz, with one or more slave clocks providing redundancy in case of failure of the master clock.

Typically, the upstream signals typically operate in a burst mode of transmission. Timing in the upstream channels is slotted, with usage over each upstream interval controlled appropriately. In other words, the upstream transmission channel is treated as a sequence of contiguous mini-slots of time. CCAP core 12 sends out periodic Media Access Protocol (MAP) messages that contain a 32-bit timestamp of the 10.24 MHz clock and describing how an upcoming series of mini-slots is to be used (e.g., describing transmission opportunities in upstream channels). The MAP messages are periodically sent out as part of bandwidth allocation and management in network 12, defining transmission availability of upstream channels for specific periods of time (e.g., time slots described as mini-slots).

A typical MAP message may grant some mini-slots for exclusive use of particular CMs that have indicated in prior request frames that they have data ready to transmit requiring a number of mini-slots to transmit. The MAP message may also set aside some mini-slots for CMs to use in contention mode and yet others that may be used only by new CMs signaling that they wish to join the network. The scheduling algorithm is controlled entirely by CCAP core 12, and, in most cases, CCAP core 12 may include intelligence that allows the detailed scheduling to change as a function of the kind of traffic currently on the network. In various embodiments, MAP messages may be generated at CCAP core 12 by an upstream scheduler/MAP builder 20, which is part of MAC 16.

With physically separate CCAP core 12 and R-PHY node 14, according to various embodiments, the DOCSIS time described by the MAP messages allows correct burst reception at R-PHY node 14 if CCAP core 12 and R-PHY node 14 have a common knowledge of the DOCSIS time (e.g., they are synchronized). Without synchronization, CCAP core 12 and R-PHY node 14 run on separate timing domains based on their own local clocks, core clock (CLK) 22 and R-PHY clock 24, respectively, leading to a potential time difference between CCAP core DOCSIS timestamp and R-PHY node DOCSIS timestamp. As used herein, a "timestamp" comprises a sequence of characters or encoded information identifying when a certain event occurred. Note that core clock 22 and R-PHY clock 24 comprise separate physical clocks, marking respective physical times.

Turning to the time difference, time difference between core clock 22 and R-PHY clock 24 can vary over time due to drift accumulation caused by frequency and accuracy difference between them. Thus, signals generated according to core clock 22 may vary in phase and/or frequency with signals generated according to R-PHY clock 24 because of the time difference between the two clocks. Moreover, the time difference between core clock 22 and R-PHY clock 24 and scheduler/MAP builder 20 based on the core clock time is likely to become invalid when the MAP messages generated by scheduler/MAP builder 20 reach CM 18. In an example scenario, CCAP core 12 creates MAP messages based on its current timestamp of 1000, and a MAP advance time of 1500. CM 18 receives the MAP message with a start allocation value of 2500, but its local time could be 3000 or some other value (e.g., based on the R-PHY clock domain) so the MAP message becomes invalid.

In addition, without frequency drift correction, even if the initial MAP message reaches CM 18 with sufficient margin, subsequent MAP messages can eventually cause problems. For example, if R-PHY clock 24 is faster than core clock 22, the MAP advance time continuously decreases until it is invalid. (Note that the MAP advance time refers to a time interval estimated by CCAP core 12 to allow for a variety of time delays (internal and external) in the round trip path between the CCAP and CM 18. In some embodiments, the MAP advance time comprises a difference between the actual DOCSIS time at CCAP core 12 at which the MAP message is generated and a future time at which R-PHY node 12 expects to receive a first burst scheduled in the MAP. MAP advance time can represent a budget of time for downstream propagation and processing of information carried in MAP messages, as well as the upstream burst transmission and propagation time.) In another example, if R-PHY clock 24 is slower than core clock 22, the MAP advance time continuously increases until performance is impacted and buffer overflow occurs at upstream physical layer (PHY) or CM 18.

According to various embodiments, a timing module 26 in CCAP core 12 compensates for any time offset and frequency drift between CCAP core 12 and R-PHY node 14 in asynchronous R-PHY network 11 in a manner transparent to R-PHY node 14 and CM 18. In various embodiments, timing module 26 generates a local logical clock (e.g., slave clock) at CCAP core 12 corresponding to R-PHY clock 24 and adjusts the local logical time at the generated logical clock based on time difference observed between core clock 22 and R-PHY clock 24.

Note that logical time, as used herein, is a value C(e) generated by a logical clock C, which is a function that maps an event e to physical time, such that for two events $e_i$ and $e_j$, $e_i$ happens before $e_j$ if $C(e_i) < C(e_j)$. C(e) need not match physical time and tracks causal events occurring on the same or dependent processes (e.g., exchange of messages between the first hardware device and the second hardware device). Note that the network can include multiple independent logical times based on various different logical clocks.

According to an example embodiment, timing module 26 uses time synchronization messages, such as Institute for Electrical and Electronics Engineers (IEEE) 1588 Precision Time Protocol (PTP) messages. In a general sense, IEEE 1588 provides time synchronization between two nodes across a packet network using various clocks, such as ordinary clock and boundary clock. The ordinary clock communicates with the network via two logical interfaces based on a single physical port: (1) an event interface is used to send and receive time sync messages, which are time-stamped by a timestamp generation block based on the value of the local clock; and (2) a general interface is used to send and receive general messages. The ordinary clock can be a slave clock or a master clock in a master-slave hierarchy. It contains a protocol engine that sends and receives PTP messages; maintains data sets; executes a state machine associated with the port; and if the port is in the slave state (synchronized to a master), it computes the master clock's time based on the received PTP timing messages and timestamps that were generated. A control loop in the local adjusts the ordinary clock to agree with the time of its master clock if the ordinary clock's port is in the slave state. Thus, for example, the slave clock locks the frequency of its ordinary clock so that it matches the timestamp of the MAP messages from the master clock. If the port is in the master state, the ordinary clock is free running or possibly synchronized to an external source of time such as a Global Positioning System (GPS)-based clock.

According to the IEEE 1588, the PTP standards define time synchronization messages and general PTP messages. Time synchronization messages are timed messages with an accurate timestamp generated at both transmission and receipt. Typically, the master clock sends a time sync message to the slave clock and notes the time t1 at which it was sent. The slave clock receives the time sync message and notes the time of reception t2. The master clock conveys to the slave timestamp t1 by embedding timestamp t1 in the time sync message, or in a follow up event message. The slave clock sends a delay request event message to the master clock and notes the time of delivery t3. The master clock conveys to the slave clock timestamp t4 of receipt by embedding it in a delay response message.

At the conclusion of the exchange of messages, the slave clock possesses all four timestamps, t1, t2, t3 and t4. The timestamps may be used to compute the time difference of the slave clock with respect to the master clock and mean propagation time of messages between the two clocks. The computation of time difference and propagation time assumes that the master-to-slave and slave-to-master propagation times are equal. Any asymmetry in propagation time introduces an error in the computed value of the time difference. The computed mean propagation time differs from the actual propagation times due to the asymmetry.

Without frequency synchronization, the master and slave clocks can drift between message updates. Because the time sync messages are sent repetitively, the slave clock can calculate the drift between the master clock and slave clock from the timestamp differences at the master clock and the slave clock. By comparing the drift over a predetermined time interval, the slave clock can synthesize a frequency that is synchronized to the master clock. After frequency synchronization is achieved, the slave clock can maintain a constant phase relationship to the master clock, and the delay request-response mechanism is used to measure the mean path delay between the master and slave clocks.

Time recovery can require a complex algorithm that is affected by various real world effects, such as slight variations in frequency, packet delay variation (PDV), and network asymmetry. For example, if the frequency at the master clock and the slave clock are not perfectly synchronized, the time at the slave clock will drift away from the master clock time. The rate of drift is proportional to the frequency difference. Moreover, if the frequency on the slave clock is recovered from the packet timing flow, the accuracy of the frequency recovery can be impacted by the PDV through the network. In another example, because time synchronization relies on constant flight time between the master clock and the slave clock, any variability in packet delivery in either direction will make it more difficult for the slave clock to accurately recover time and frequency. Each calculation of frequency drift, time offset and one-way delay can produce unique results based on the PDV in the network.

According to various embodiments, timing module 26 may create clock domain island(s) in CCAP core 12 to track the time difference between CCAP core 12 and R-PHY node 14 via IEEE 1588 or other timing protocol sync messages. Timing module 26 may re-stamp timestamps in event messages (e.g., MAP messages) based on the time difference tracked between CCAP core 12 and R-PHY node 14 based on time sync messages. As described herein, the terms "re-stamp" and "re-stamping" of the timestamps can encompass replacing the timestamps generated in core clock 22's time domain with corresponding timestamps in R-PHY clock 24's time domain (or vice versa), either in a new (e.g., updated) corresponding event message or inserted into the pre-existing event message.

In some embodiments, timing module 26 may delete time (i.e., delay) for purposes of downstream transmissions (for signaling purposes) when core clock 22 is faster than R-PHY clock 24, and insert time (i.e., hasten) for purposes of downstream transmissions when core clock 22 is slower than R-PHY clock 24. In some embodiments, the amount of time deleted and/or inserted (i.e., downstream transmissions delayed or hastened, respectively) is based on the time difference between core clock 22 and R-PHY clock 24 tracked over a predetermined time interval.

Timing module 26 may also adjust Narrowband Digital Forward (NDF) sample rate at CCAP core 12 by punching out or adding samples. In some embodiments, timing module 26 may puncture out samples when core clock 22 is faster than R-PHY clock 24, and add samples when core clock 22 is slower than R-PHY clock 24. The sample puncturing and/or addition rate is based on the time difference between core clock 22 and R-PHY clock 24 tracked over a predetermined time interval.

According to various embodiments, communication system 10 may have multiple clock domains, according to different R-PHY clocks 24 in communication system 10 that function as different masters in a master-slave hierarchy (e.g., 1588 master-slave hierarchy). For example, a master module 28 at each R-PHY node 14 distributes its frequency and phase information through time synchronization (sync) messages 30 (e.g., 1588 PTP messages) to a corresponding slave module 32 at CCAP core 12.

In various embodiments, the time sync messages 30 and the corresponding receive times are placed in an envelope and punted to a local processor in CCAP core 12 for time processing. The local processor maintains a rolling sample table that is used to compute the network delay and clock drift (e.g., time difference). In some embodiments, the timestamps of received time sync messages 30 are initially adjusted (e.g., to match the remote time of R-PHY node 14 or to match local time at CCAP core 12) so that time delay computations may be performed on a common clock domain (e.g., clock domain of R-PHY clock 24). Further, from the sample receive time, the delay at CCAP core 12 may be computed; from the sample transmit timestamps, the time difference at R-PHY node 14 may be computed; the difference between the two computations may indicate the clock drift, with a negative drift (higher CCAP delay) indicating that R-PHY clock 24 is faster than core clock 22 and a positive drift (lower CCAP delay) indicating that R-PHY clock 24 is slower than core clock 22.

If core clock 22 is faster than R-PHY clock 24 (e.g., clock domain corresponding to R-PHY clock 24 is slower than core clock 22), CCAP core 12 may periodically not schedule any information elements (IE) in downstream MAP messages and adjusts its MAP acknowledgement (ACK) time. In effect, CCAP core 12 deletes time from (e.g., delays) downstream transmissions (e.g., comprising MAP messages). The duration of the blanking period (e.g., deleted time interval, delayed time interval) can be determined by the clock drift (e.g., time difference between core clock 22 and R-PHY clock 24). In some embodiments, CCAP core 12 may accumulate drift ticks and compute the drifts in ticks per second. The computed drift may be provided to scheduler/MAP builder 20. Depending on the mini-slot size, scheduler/MAP builder 20 determines when to send a short MAP message with unscheduled time at the end of the MAP message. In some embodiments, substantially simultaneously, scheduler/MAP builder 20 reduces the MAP acknowledgement time for the next MAP by an equivalent amount of mini-slots. In effect, when R-PHY node 14 receives the MAP messages with the blanking period and rewrites the allocation start time, it will not have any IEs that would be out of bounds of its slower clock domain.

If core clock 22 is slower than R-PHY clock 24 (e.g., clock domain corresponding to R-PHY clock 24 is faster than core clock 22), CCAP core 12 may feed the drift computation information (as above) to scheduler/MAP builder 20. In some embodiments, scheduler/MAP builder 20 may determine when one or more additional mini-slots is scheduled, based on the drift rate. In effect, CCAP core 12 adds time (e.g., through additional mini-slots) in downstream transmissions. R-PHY node 14 receiving the MAP messages with the additional mini-slots rewrites the allocation start time with enough IEs to fill in the faster clock domain. In other embodiments, CCAP core 12 delays or hastens the downstream MAP transmissions based on the time difference between core clock 12 and R-PHY clock 24.

In many embodiments, MAC 16 obtains the frequency and phase information from time sync messages 30 and runs a phase calibration process to track the R-PHY time without acquiring frequency synchronization. MAC 16's timestamp is driven by frequency of core clock 22; however the new timestamp values recovered from time sync messages 30 are loaded periodically, so that MAC 16's timestamp is corrected before it drifts away from the R-PHY timestamp. To give an example, if the frequency accuracy of core clock 22 is +5 parts per million (PPM), frequency accuracy of R-PHY clock 24 is −5 PPM, and update frequency is set once per second, MAC 16's timestamp will be 10 μs ahead of the R-PHY timestamp at the end of the one second even if they were perfectly aligned at the beginning of the second. Thereupon, MAC 16's timestamp may be updated to align the timestamps.

In some embodiments, R-PHY clock 24 may execute in a free run mode with its frequency driven from an internal frequency source such as an oscillator, and its time driven from a time protocol such as Network Time Protocol (NTP). In other embodiments, R-PHY clock 24 may synchronize to a 1588 grand master (GM) in the packet network for both frequency and time. In the latter case, R-PHY clock 24 may execute as a 1588 boundary clock rather than an ordinary clock (e.g., it is a slave clock to the 1588 GM in the network and a master clock to CCAP core 12). Likewise, CCAP core 12 may execute in free run mode is some embodiments, or may synchronize to an external source in other embodiments. It may be noted that the clock synchronization modes of either or both entities (e.g., CCAP core 12 and R-PHY node 14) do not impact the DOCSIS operation when R-PHY node 14 acts as the master to CCAP core 12.

Turning to the infrastructure of communication system 10, the network topology can include any number of customer premises equipment, servers, switches (including distributed virtual switches), routers, and other nodes interconnected to form a large and complex network. Network 11 represents a series of points or nodes of interconnected communication paths for receiving and transmitting packets and/or frames of information that are delivered to communication system 10. A node may be any electronic device, computer, printer, hard disk drive, client, server, peer, service, application, or other object capable of sending, receiving, or forwarding information over communications channels in a network. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs.

Network 11 offers a communicative interface between cable modem network components, and may include any local area network (LAN), wireless local area network (WLAN), metropolitan area network (MAN), Intranet, Internet, Extranet, wide area network (WAN), virtual private network (VPN), or any other appropriate architecture or system that facilitates communications in a network environment. Network 11 may implement any suitable communication protocol for transmitting and receiving data packets within communication system 10. The architecture of the present disclosure may include a configuration capable of TCP/IP, TDMA, and/or other communications for the electronic transmission or reception information in a network. The architecture of the present disclosure may also operate in conjunction with any suitable protocol, where appropriate and based on particular needs. In addition, gateways, routers, switches, and any other suitable nodes (physical or virtual) may be used to facilitate electronic communication between various nodes in the network.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that communication system 10 shown in FIG. 1 is simplified for ease of illustration.

In some embodiments, a communication link may represent any electronic link supporting a network environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

In particular embodiments, CCAP core 12 may comprise a hardware appliance with appropriate ports, processors, memory elements, interfaces, and other electrical and electronic components that facilitate the functions described herein. In some embodiments, timing module 26 may comprise a hardware device or software application or combination thereof executing within CCAP core 12 to perform the operations described herein. In other embodiments, timing module 26 may comprise a hardware device or software application executing outside CCAP core 12, for example, in a separate appliance, server, or other network element and coupled (e.g., connected to, in communication with, etc.) to CCAP core 12 in network 11.

R-PHY node 14 may comprise suitable hardware components and interfaces for facilitating the operations described herein. In some embodiments, R-PHY node 14 may be embedded in or be part of another hardware component, such as a broadband processing engine (comprising a motherboard, microprocessors and other hardware components). In some embodiments, R-PHY node 14 comprises downstream and upstream PHY, deployed in a Coaxial Media Converter (CMC) that supports RF functions at the PHY layer.

Figure 2:
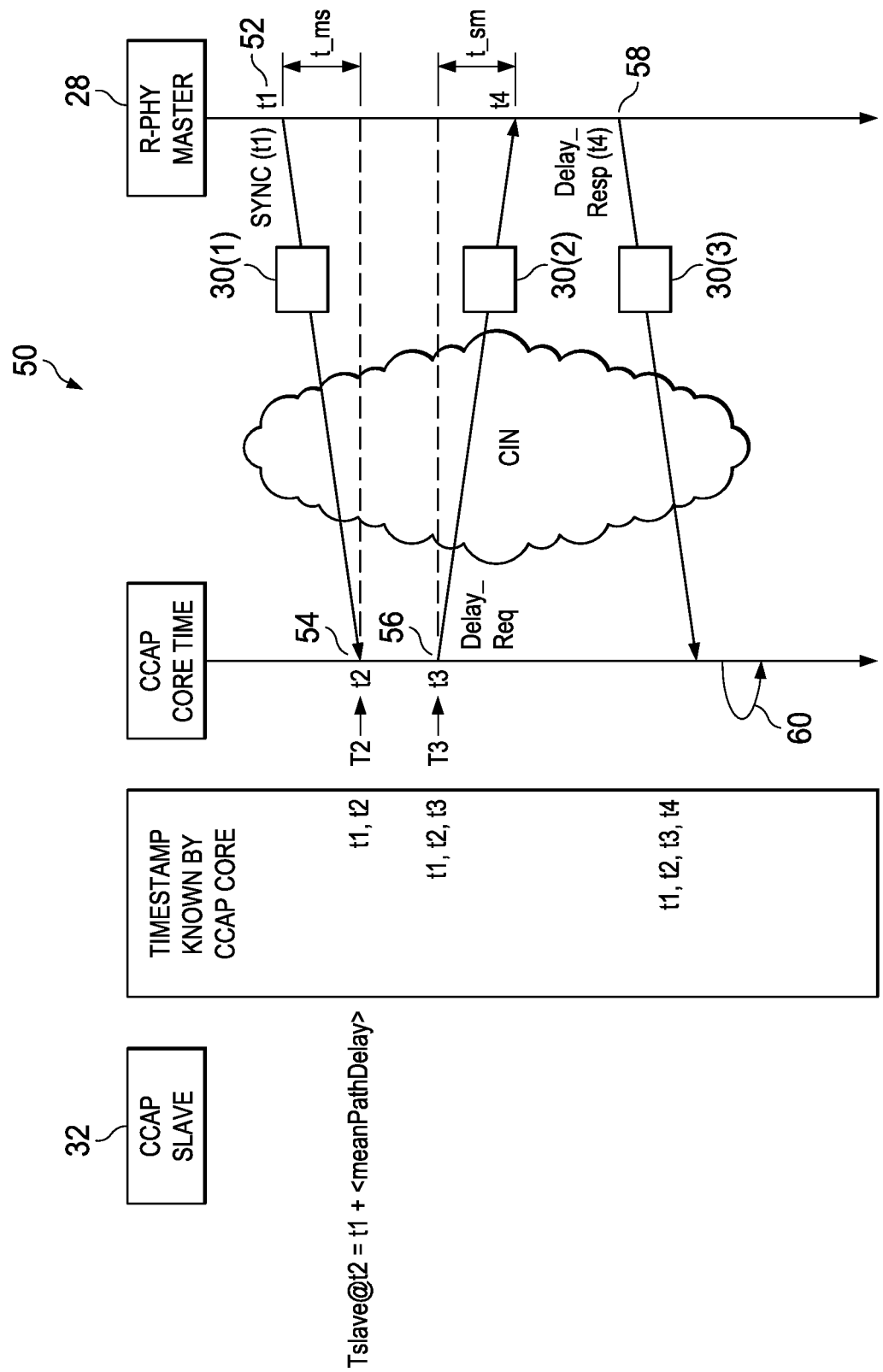
FIG. 2 is a simplified sequence diagram illustrating example operations that may be associated with embodiments of the communication system.

Turning to FIG. 2, FIG. 2 is a simplified sequence diagram illustrating example operations 50 that may be associated with embodiments of communication system 10. At 52, R-PHY master module 28 sends time sync message 30(1) to slave module 32 at CCAP core 12 and notes time t1 at which it was sent. Time t1 corresponds to local time of R-PHY clock 24. R-PHY master module 28 conveys to slave module 32 timestamp t1 by either embedding timestamp t1 in time sync message 30(1) in some embodiments or embedding timestamp t1 in a follow up event message in other embodiments.

At 54, slave module 32 receives time sync message 30(1) and stamps time of reception T2, where T2 corresponds to local time of core clock 22. Timing module 26 at CCAP core 12 may correlate T2 in time sync message 30(1) with t2, corresponding to analogous local time of R-PHY clock 24 based on the time difference tracked between CCAP core 12 and R-PHY node 14. For example, assume that R-PHY node 14 is located in Pacific Standard Time, and CCAP core 12 is located in Central Standard Time. Therefore, T2=10:00 AM corresponds to t2=8:00 AM.

At 56, slave module 32 generates delay request message (time sync message 30(2)) and notes local time of delivery T3. In some embodiments, timing module 26 at CCAP core 12 may re-stamp T3 in time sync message 30(2) to t3, corresponding to analogous local time of R-PHY clock 24 based on the time difference tracked between CCAP core 12 and R-PHY node 14. In other embodiments, the re-stamping may not be implemented. Slave module 32 sends delay request message 30(2) to R-PHY master module 28 stamped with time of delivery t3. At 58, master module 28 at R-PHY node 14 conveys to slave module 32 local timestamp t4 of receipt by embedding it in delay response message (time sync message 30(3)). At the conclusion of the exchange of messages as described herein, slave module 32 possesses all four timestamps (t1, t2, t3, t4), which may be used to compute the mean propagation time of messages between the two clocks according to the following formula:

$$\langle meanPathDelay \rangle = \frac{[(t2-t1)+(t4-t3)]}{2} = \frac{[(t2-t3)+(t4-t1)]}{2}$$

The slave time on the next time t2 is:

$$T\text{slave}@t2 = t1 + \langle meanPathDelay \rangle$$

Note that in some embodiments, the re-stamping logic may transform all timestamps (e.g., t1, t2, t3 and t4) to local time of core clock 22, rather than local time of R-PHY clock 24.

Because PTP assumes that the master-to-slave ($t_{ms}$) and slave-to-master ($t_{sm}$) paths are perfectly symmetrical, any asymmetry in the paths will result in a time difference between the master and slave nodes equal to the following basic formula:

$$t\_error = \frac{t\_ms - t\_sm}{2}$$

The asymmetry can arise from many sources, including but not limited to: network topology differences, location differences within the master, slave, or transparent clock nodes, and node delay asymmetry through nonparticipant nodes.

Note that although the physical frequency of core clock 22 is not synchronized to R-PHY clock 24, drift information may be used to achieve higher accuracy for time synchronization. The accuracy of the synchronization can impact round trip delay and MAP advance time calculations. The synchronization accuracy can be affected by many factors such as timestamp mechanism, network topology, traffic behavior, client algorithms, etc.

Because the physical frequency between core clock 22 and R-PHY clock 24 is not synchronized, drift accumulation due to frequency drift between updates could contribute to additional phase error if the corrective mechanisms described herein are not implemented. At 60, timing module 26 deletes time intervals (e.g., delays according to the deleted time intervals) if core clock 22 is faster than R-PHY clock 24 and inserts time intervals (e.g., hastens according to the inserted time intervals) if core clock 22 is slower than R-PHY clock 24. In some embodiments, at 60, timing module 26 may adjust NDF sample rate at CCAP core 12 by punching out or adding samples according to the tracked time difference.

Figure 3:
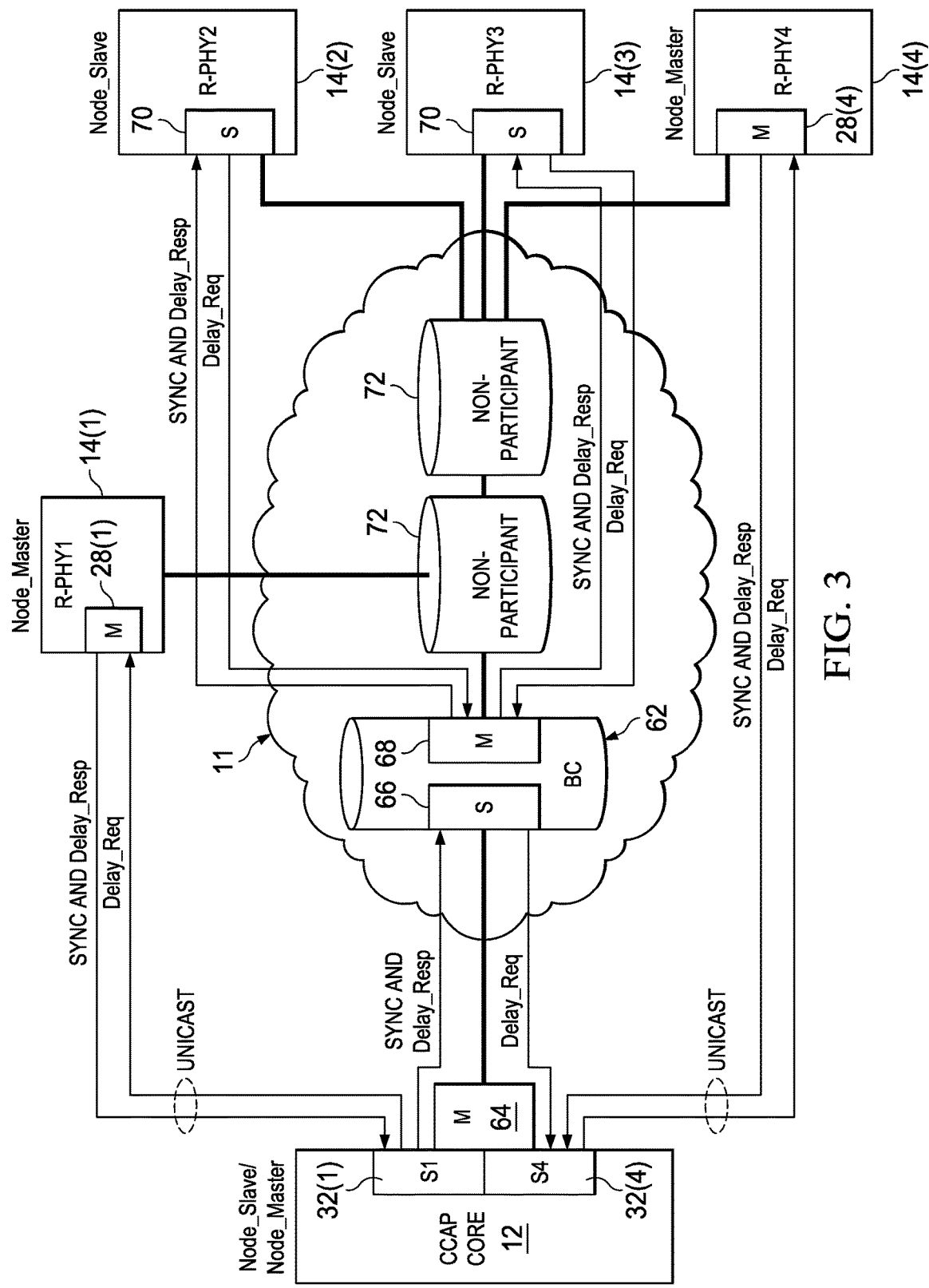
FIG. 3 is a simplified block diagram illustrating example details of embodiments of the communication system.

Turning to FIG. 3, FIG. 3 is a simplified block diagram illustrating example details of an embodiment of communication system 10. CCAP core 12 can be connected to a plurality of R-PHY nodes 14(1)-14(4), each of which can be on different clock domains, for example, each running on its own oscillator. A boundary clock (BC) 62 in network 11 may synchronize to CCAP core 12 through corresponding master module 64 at CCAP core 12 and slave module 66 at BC 62, with CCAP core 12 acting as the 1588 grandmaster clock of the 1588 clock domain. A master module 68 in BC 62 may synchronize with slave modules 70 in R-PHY nodes 14(2) and 14(3), which operate in DOCSIS Node_Slave mode (e.g., with R-PHY node 14 acting as slave and CCAP core 12 acting as master). In such configuration, the timing operations are performed between master module 68/slave modules 70 and between master module 64 and slave module 66 separately.

According to various embodiments, substantially simultaneously, CCAP core 12 may act as a slave to different R-PHY nodes 14(1) and 14(4). The DOCSIS operation mode between CCAP core 12 and R-PHY nodes 14(1) and 14(4) is Node_Master mode. Note that each R-PHY node 14(1)-14(4) may be connected through various network elements 72 to BC 62 and CCAP core 12. Network elements 72 may or may not participate in timing operations as described herein based on particular configuration needs. In various embodiments, the 1588 protocol between CCAP core 12 and R-PHY nodes 14(1) and 14(4) is established in a unicast model so that BC 62 can forward the messages accordingly. A unicast model may be implemented for Node_Master operations unless 1588 aware nodes (e.g., participating nodes) in the CIN can be configured as 1588 transparent clock (version 2 of IEEE 1588 specification introduces transparent clocks as an alternative to implementing boundary clocks for multiport devices such as bridges, switches and routers).

According to the example embodiment illustrated in the figure, there are three independent clock domains: (1) R-PHY node 14(1)-CCAP core 12; (2) R-PHY node 14(4)-CCAP core 12; and (3) CCAP core 12—R-PHY nodes 14(2) and 14(3). CCAP core 12 tracks each individual clock domain separately through separate clock islands in timing module 26. For example, each 1588 master module 28(1) and 28(4) executing in respective R-PHY node 14(1) and 14(4) may correspond to a separate slave module 32(1) and 32(4) in CCAP core 12. Each master module 28(1) and 28(4) may communicate separate 1588 PTP time sync messages with corresponding slave modules 32(1) and 32(4) at CCAP core 12. CCAP core 12 executes as an ordinary clock (slave) in each 1588 clock domain, but it may participate in hundreds or even thousands of 1588 clock domains substantially simultaneously. Note that network 11 may include multiple CCAP core 12, each interfacing with a plurality of R-PHY nodes 14 in Node_Master mode.

Figure 4:
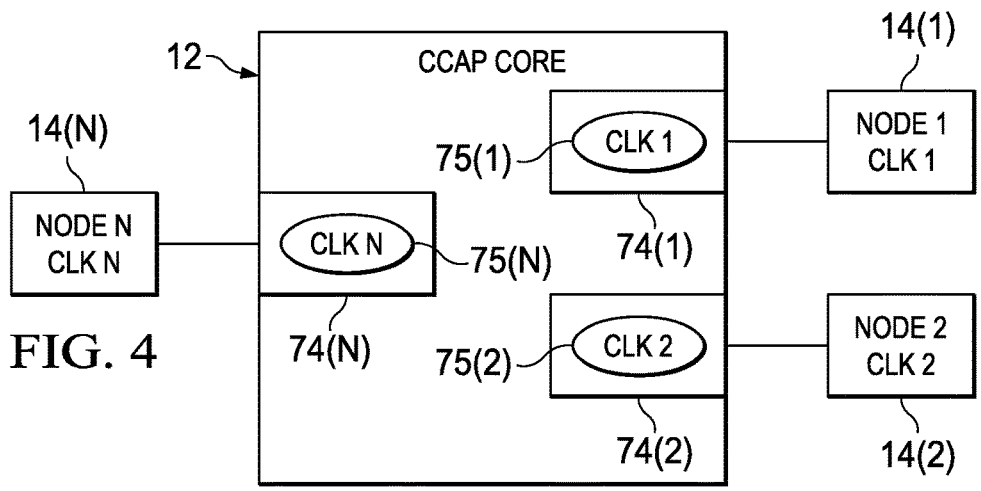
FIG. 4 is a simplified block diagram illustrating other example details of embodiments of the communication system.

Turning to FIG. 4, FIG. 4 is a simplified block diagram illustrating example details of an embodiment of communication system 10. Current remote DOCSIS timing interface (R-DTI) specifications mandate R-PHY Node_Slave mode, with optional Node_Master mode. Optional Node_Master mode allows R-PHY nodes 14(1)-14(N) not to implement 1588v2 client servo to reduce the cost (e.g., support 1588 protocol stack, with no servo circuitry). Furthermore, the 1588 master may experience a glitch and may not operate properly for short periods of time, such as during failover. At such times, because the 1588 client servo takes long time to converge, R-PHY nodes 14(1)-14(N) may operate effectively in an asynchronous mode (e.g., asynchronous with the master at CCAP core 12).

According to various embodiments, in both Node_Master mode and asynchronous mode, CCAP core 12 manages time offset and frequency drift (e.g., together comprising time difference) between CCAP core 12 and R-PHY nodes 14(1)-14(N) by generating multiple clock domain islands 74(1)-74(N), each corresponding to an R-PHY node 14(1)-14(N) that runs in master clock mode, or that is not synchronized in time and frequency with CCAP core 12. Each clock domain island 74(1)-74(N) manages the time and/or clock differences between CCAP core 12 and corresponding R-PHY nodes 14(1)-14(N). In some embodiments, clock domain islands 74(1)-74(N) are implemented in hardware; in other embodiments, clock domain islands 74(1)-74(N) are implemented in software.

Each clock domain island 74(1)-74(N) may comprise a respective slave clock 75(1)-75(N) that effectively (e.g., logically) duplicates the corresponding master clock at R-PHY nodes 14(1)-14(N). In an example embodiment, each slave clock 75(1)-75(N) comprises a separate logical clock. For example (and not as a limitation), if CLK1 at R-PHY node 14(1) is slower by 40 μs/sec than core clock 22 at CCAP core 12, slave clock 75(1) at clock domain island 74(1) in CCAP core 12 is also slower by 40 μs/sec than core clock 22. Likewise (and not as a limitation), if CLK2 at R-PHY node 14(2) is faster by 50 μs/sec than core clock 22 at CCAP core 12, slave clock 75(2) at clock domain island 74(2) in CCAP core 12 is also faster by 50 μs/sec than core clock 22. Slave clocks 75(1)-75(N) may be used by CCAP core 12 for downstream transmissions to respective R-PHY nodes 14(1)-14(N).

Figure 5:
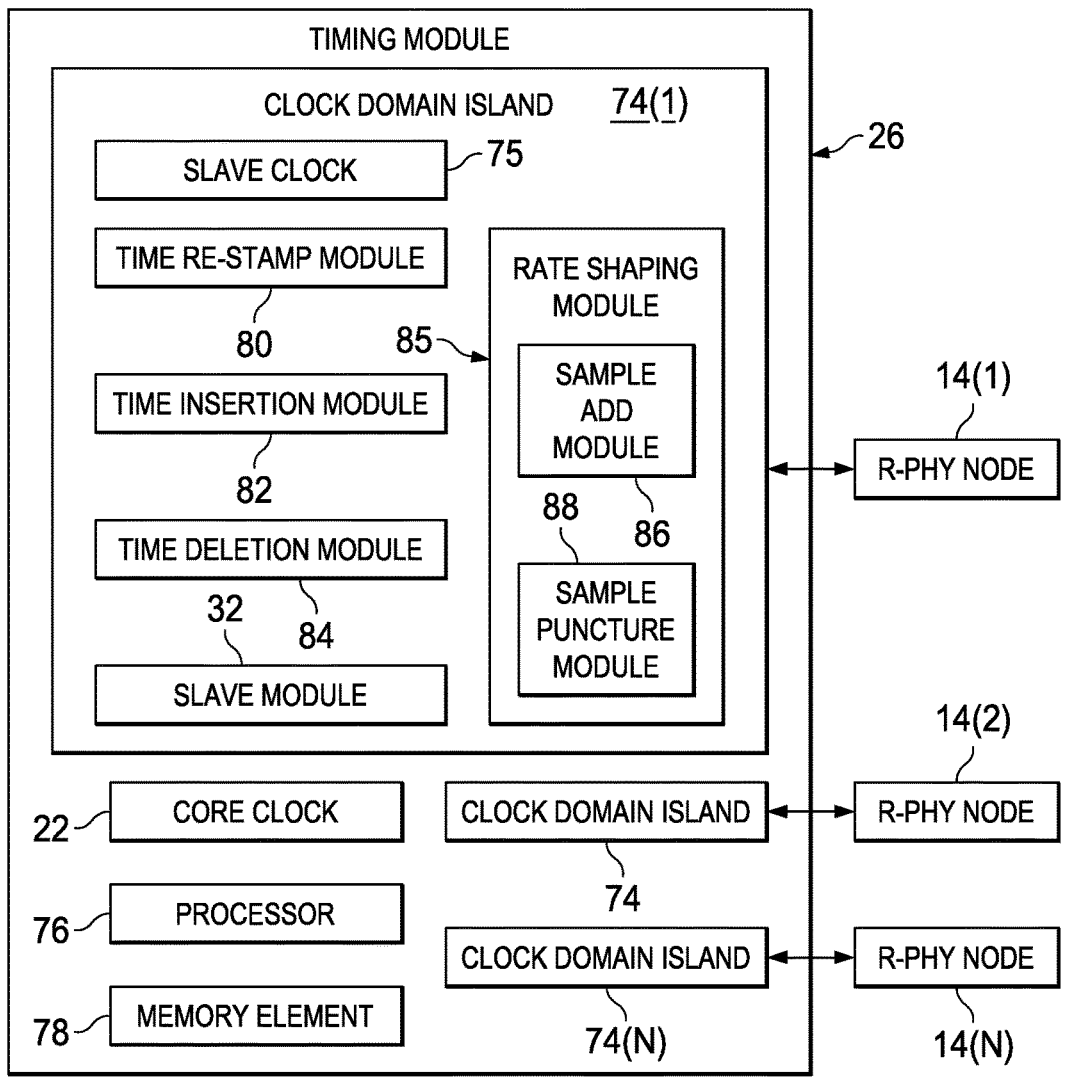
FIG. 5 is a simplified block diagram illustrating yet other example details of embodiments of the communication system.

Turning to FIG. 5, FIG. 5 is a simplified block diagram illustrating example details of an embodiment of communication system 10. Example timing module 26 includes a plurality of clock domain islands 74(1)-72(N), each one corresponding to a respective master R-PHY node 14(1) . . . 14(N) associated therewith in network 11. Timing module 26 includes a processor 76 and memory element 78, both of which may be shared by the plurality of clock domain islands 74 executing therein. In some embodiments, CCAP core 12 may include processor 76 and memory element 78, which may be shared by substantially all software modules and other applications executing therein, including by timing module 26. Timing module 26 may interface with core clock 22 for various timing operations as described herein.

Each clock domain island 74(1) . . . 74(N) includes slave clock 75, a time re-stamp module 80, a time insertion module 82, a time deletion module 84, and a rate shaping module 85 including a sample add module 86 and a sample puncture module 88. Each clock domain island 74(1) . . . 74(N) may be associated with a corresponding slave module 32 that interfaces with a respective master module in one of R-PHY nodes 14(1)-14(N). Time re-stamp module 80 re-stamps event messages (e.g., MAP messages) with updated timestamps to make the timestamps consistent with or relevant to the local time as indicated by core clock 22, or vice versa. For example, assume merely for the sake of discussion and not as a limitation that R-PHY node 14(1) is located in California, with its local clock following Pacific Standard Time (PST) and CCAP core 12 is located in Texas, with its local clock following Central Standard Time (CST). An event message received at CCAP core 12 in Texas at 10:01 AM from R-PHY node 14(1) with a timestamp of transmission corresponding to 8:00 AM in California may be re-stamped by time re-stamp module 80 of clock domain island 74(1) with a timestamp indicating 8:01 AM to ensure consistency with the local time of master clock at R-PHY node 14(1).

Assume, merely for the sake of discussion, that R-PHY node 14(2) is located in New York, with local time corresponding to Eastern Standard Time (EST). Another event message received at CCAP core 12 in Texas at 10:01 AM CST from R-PHY node 14(2) with a timestamp of transmission corresponding to 11:00 AM PST in California may be re-stamped by time re-stamp module 80 of clock domain island 74(2) with a timestamp indicating 11:01 AM to ensure consistency with the local time of the master clock at R-PHY node 14(2). Thus, although the arrival timestamps of the event messages originally indicated different times (e.g., 10:01 AM CST), they are re-stamped to different remote times (e.g., 8:01 AM PST and 11:01 EST) based on the relative time differences between CCAP core 12 and respective R-PHY nodes 14(1)-14(2). Moreover, each clock domain island 74(1)-74(N) independently tracks its relative time difference with associated R-PHY nodes 14(1)-14(N). In some embodiments, time re-stamp module 80 of each clock domain island 74(1) may adjust the respective local logical time at slave clock 75 to match the master clock time at corresponding R-PHY nodes 14(1)-14(N) based on the time difference determined from time sync messages 30 between CCAP core 12 and R-PHY nodes 14(1)-14(N).

Time insertion module 82 inserts time in slave clock 75 for downstream transmissions between the CCAP and CMs 18 (or between CCAP core 12 and R-PHY node 14) if core clock 22 is slower than R-PHY clock 24. Time insertion results in hastening downstream transmissions. For example, and not as a limitation, assume core clock 22 is slower than R-PHY clock 24 by 3 seconds every minute. At the end of the first minute, core clock 22 is slower than R-PHY clock 24 by 3 seconds; at the end of the second minute, core clock 22 is slower than R-PHY clock 24 by 6 seconds; at the end of the third minute, core clock 22 is slower than R-PHY clock 24 by 9 seconds; and so on. In an example embodiment, time insertion module 82 may insert 15 seconds at the end of every 5 minutes. In other words, core clock 22 may send a first downstream transmission at 6:00:00 AM according to core clock 22; the next downstream transmission may be scheduled at 6:05:00 AM according to core clock 22. Timing module 82 may insert 15 seconds into the local physical time, hastening the downstream transmission, so that the next downstream transmission is sent at 6:04:45 AM local time, which corresponds to 6:05:00 AM at R-PHY clock 24. In some embodiments, the time insertion occurs at a frame boundary (e.g., according to DOCSIS 3.1) of downstream transmissions (e.g., MAP messages). In other embodiments, the time insertion occurs at a mini-slot boundary (e.g., according to DOCSIS 3.0) of downstream transmissions.

Time deletion module 84 deletes time from slave clock 75 for downstream transmissions between the CCAP and CMs 18 (or between CCAP core 12 and R-PHY node 14) if core clock 22 is faster than R-PHY clock 24. Time deletion results in delaying downstream transmissions. For example, and not as a limitation, assume core clock 22 is faster than R-PHY clock 24 by 3 seconds every minute. At the end of the first minute, core clock 22 is faster than R-PHY clock 24 by 3 seconds; at the end of the second minute, core clock 22 is faster than R-PHY clock 24 by 6 seconds; at the end of the third minute, core clock 22 is faster than R-PHY clock 24 by 9 seconds; and so on. In an example embodiment, time deletion module 84 may delete 15 seconds at the end of every 5 minutes. In other words, core clock 22 may send a first downstream transmission at 6:00:00 AM according to core clock 22; the next downstream transmission may be scheduled at local clock time 6:05:00 AM according to core clock 22. Timing module 82 may delete 15 seconds from the local time, delaying the downstream transmission, so that the next downstream transmission is sent at 6:05:15 AM local time, which corresponds to 6:05:00 AM at R-PHY clock 24.

In various embodiments, time re-stamp works in conjunction with time insertion and deletion in the case where CCAP core 12 and respective R-PHY nodes 14(1)-14(N) have different clock rates (e.g., within 10 ppm clock error). In some embodiments, the time difference between CCAP core 12 and respective R-PHY nodes 14(1)-14(N) is updated via 1588 sync messages substantially constantly (e.g., continually, continuously, periodically, regularly, etc.); however, the time difference Δt used in the time re-stamp may be updated in conjunction with time insertion and deletion (e.g., rather than periodically), for example, to maintain network time integrity.

In various embodiments, rate shaping module 85 can ensure that samples for NDF/NDR purposes are sent from CCAP core 12 to R-PHY nodes 14(1)-14(N) at a rate that, on average, matches (e.g., substantially exactly) the symbol rate of respective R-PHY nodes 14(1)-14(N) (e.g., towards corresponding CMs), for example, so that First In First Out (FIFO) in R-PHY nodes 14(1)-14(N) is not over-flown or under-flown because of frequency drift between core clock 22 and R-PHY clock 24. In some embodiments, to match the sample rates of CCAP core 12 and R-PHY node 14 in the case where CCAP core 12 and R-PHY node 14 are not synchronized in time and frequency (e.g., asynchronous mode), rate reduction and/or expansion as appropriate is implemented in CCAP core 12.

The rate reduction with NDF is similar to time deletion in DOCSIS. The time difference between core clock 22 and R-PHY clock 24 is tracked, and if core clock 22 is faster than R-PHY clock 24, sample puncture module 88 punctures out (e.g., deletes) samples periodically to slow down the core sample rate. The rate expansion with NDF is similar to the time insertion in DOCSIS. The time difference between core clock 22 and R-PHY clock 24 is tracked, and if core clock 22 is slower than R-PHY clock 24, sample add module 86 adds samples periodically to expand its sample rate to match with R-PHY node 14. In some embodiments, the added samples have zero magnitude. In other embodiments, the added samples are interpolated from neighboring samples. In various embodiments, the sample puncturing and addition occur at an output of an analog-to-digital converter in base band (e.g., after mixing) at CCAP core 12.

Figure 6:
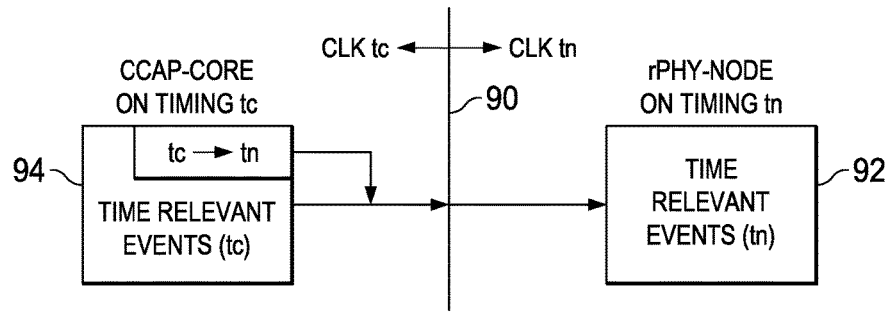
FIG. 6 is a simplified block diagram illustrating yet other example details of embodiments of the communication system.

Turning to FIG. 6, FIG. 6 is a simplified block diagram illustrating example details according to an embodiment of communication system 10. According to various embodiments, event messages crossing clock boundaries, such as clock boundary 90, are time re-stamped for consistency and/or relevancy with local timing. Assume, merely for example purposes, that an event message is time stamped at time tn relative to a local time of R-PHY clock 24 at R-PHY node 14. However, time tn corresponds to time tc at core clock 22. Such would be the case, for example, if R-PHY node 14 is located in California, and CCAP core 12 is located in a different time zone, such as Texas. Another example would be the case where R-PHY node 14 and CCAP core 12 are located in the same time zone but have slightly different local times, for example, due to synchronization errors (e.g., with a grandmaster clock in the clock domain), clock errors (e.g., defects in the clock), or clock differences (e.g., different crystals used to generate clocks).

Time relevant events 92 occurring at time tn, corresponding to the local time at R-PHY node 14 (e.g., on one side of clock boundary 90) would correspond to time relevant events 94 occurring at time tc, corresponding to the local time at CCAP core 12 (e.g., on the other side of clock boundary 90). According to various embodiments, clock domain island 74 at CCAP core 12 converts between the local times of R-PHY node 14 and CCAP core 12, for example, using the formula: tn=tc+Δt, where Δt is the time difference between CCAP core 12 and R-PHY node 14 extracted (e.g., derived, calculated, determined, etc.) from 1588 time synchronization messages or other equivalent time sync or event messages.

Figure 7:
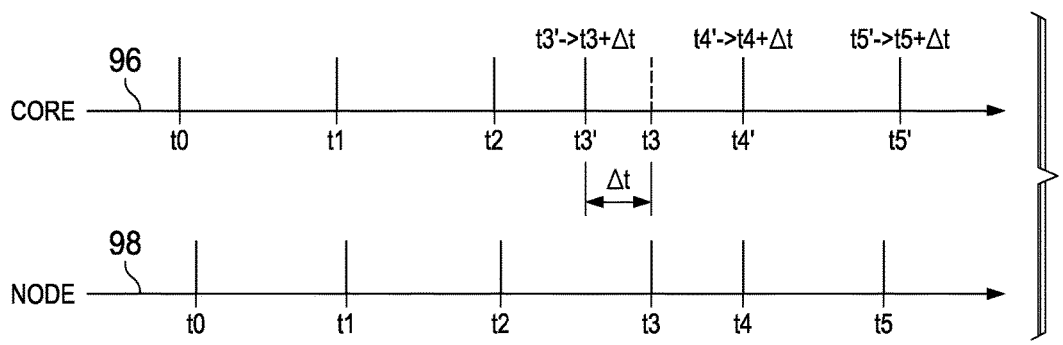
FIG. 7 is a simplified block diagram illustrating yet other example details of embodiments of the communication system.

Turning to FIG. 7, FIG. 7 is a simplified block diagram illustrating example details according to an embodiment of communication system 10. Assume that time at core clock 22 follows a pattern 96 and time at R-PHY clock 24 follows another pattern 98, with pattern 96 being slower (e.g., having lower frequency) than pattern 98. In other words, starting at time t0, a 1 second interval (say t1) according to core clock 24 occurs earlier at R-PHY clock 24. Over a pre-determined time interval, say from t0 to t3, the time difference accumulates to Δt. Time insertion module 82 corresponding to the specific clock island at CCAP core 12 may insert time in (e.g., hasten) downstream transmissions (e.g., MAP messages) corresponding to the time difference Δt at t3 to correct the local time to t3'=t3+Δt. Subsequent timestamps t4 and t5, etc. may also be corrected to t4'=t4+Δt, t5'=t5+Δt, and so on.

In some embodiments, Δt can have a granularity of one mini-slot. Note that the time corrections need not be accurate and can be roughly estimated based on time synchronization event messages, such as IEEE 1588 messages. In many embodiments, a scheduler at CCAP core 12 may not schedule any upstream transmissions between t3−Δt and t3 of its local time. Time insertion can effectively leave one Δt unused at R-PHY node 14 (e.g., slowing down the data rate at R-PHY node 14). Note that no upstream grants cross the time at which the time insertion occurs.

Assume, merely for example purposes and not as a limitation that the frequency drift between core clock 22 and R-PHY clock 24 is 10 ppm with ±5 ppm clock accuracy. According to one embodiment, the rate of time insertion can be one upstream mini-slot (e.g., one upstream frame in DOCSIS 3.1) every 100 k upstream mini-slots (e.g., the rate of time insertion can be once every 40 seconds for a 400 μs frame duration in DOCSIS 3.1).

Figure 8:
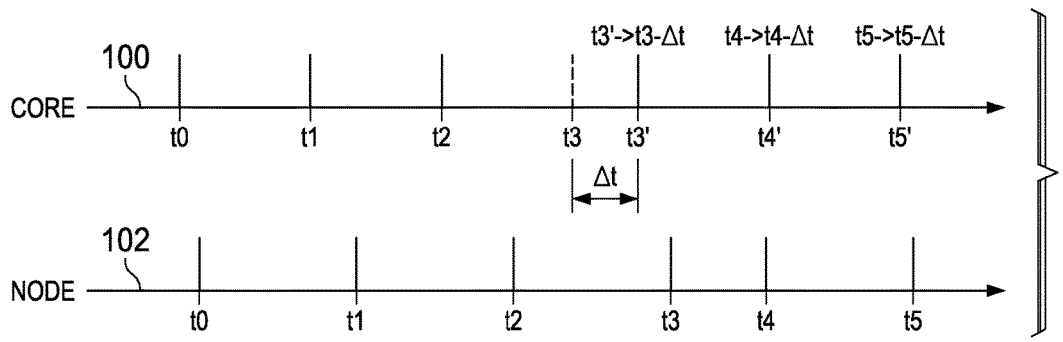
FIG. 8 is a simplified block diagram illustrating yet other example details of embodiments of the communication system.

Turning to FIG. 8, FIG. 8 is a simplified block diagram illustrating example details according to an embodiment of communication system 10. Assume that time at core clock 22 follows a pattern 100 and time at R-PHY clock 24 follows another pattern 102, with pattern 102 being slower (e.g., having lower frequency) than pattern 100. In other words, starting at time t0, a 1 second interval (say t1) according to core clock 24 occurs later at R-PHY clock 24. Over a pre-determined time interval, say from t0 to t3, the time difference accumulates to Δt. Time deletion module 84 corresponding to the specific clock island at CCAP core 12 may delete time from (e.g., delay) downstream transmissions (e.g., MAP messages) corresponding to the time difference Δt at t3 to correct the local time to t3'=t3−Δt. Subsequent timestamps t4 and t5, etc. may also be corrected to t4'=t4−Δt, t5'=t5−Δt, and so on.

Note that the time corrections need not be accurate and can be roughly estimated based on event messages, such as IEEE 1588 time synchronization messages. The scheduler at CCAP core 12 can schedule upstream transmissions as usual, however, with Δt less time at its disposal after t3' (=t3−Δt), which effectively slows down CCAP core 12 by Δt. In some embodiments, Δt in time deletion can have a granularity of one symbol (signatures of a signal each phase-shifted from the other by 90 degrees are called symbols). Note that in various embodiments, time deletion is transparent to R-PHY node 14 and CM 18.

Assume, merely for example purposes and not as a limitation that the frequency drift between core clock 22 and R-PHY clock 24 is 10 ppm with ±5 ppm clock accuracy. According to one embodiment, the rate of time deletion may be one upstream symbol every 100 k symbols (e.g., the rate of time deletion can be once every 2 seconds for a 20 μs symbol duration length).

In various embodiments, the time difference used as a trigger for time insertion or deletion need not be accurate (e.g., time need not be updated exactly at a specific time point). For example, if 1 ms accuracy in time between core clock 22 and R-PHY node 14 is to be achieved (e.g., as per requirement of R-DTI), the time difference accuracy could be 0.5 ms. With 0.5 ms timing accuracy, CCAP core 12 may simply compute the time difference through averaging time sync messages 30.

Figure 9:
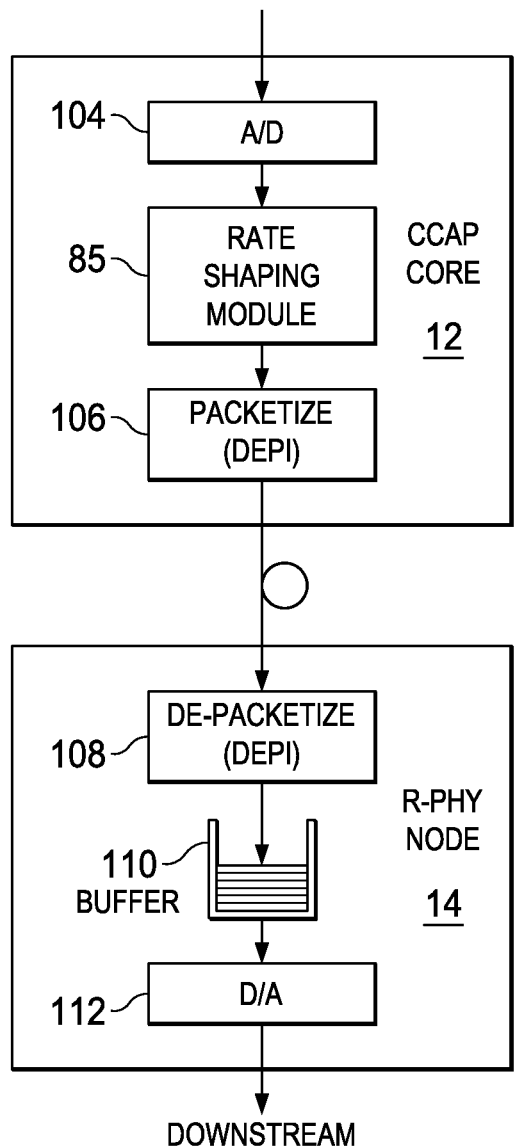
FIG. 9 is a simplified block diagram illustrating yet other example details of embodiments of the communication system.

Turning to FIG. 9, FIG. 9 is a simplified block diagram illustrating example details according to an embodiment of communication system 10. Example CCAP core 12 includes an analog-to-digital converter (A/D) 104, rate shaping module 85, and a packetize module 106 (Downstream External PHY Interface (DEPI)). The rate reduction with NDF is similar to the time deletion in DOCSIS. The time difference between CCAP core 12 and R-PHY node 14 is tracked, and if core clock 22 is faster than R-PHY clock 24, rate shaping module 85 punctures out samples on occasion to slow down the core sample rate. Likewise, the rate expansion with NDF is similar to the time insertion in DOCSIS. The time difference between CCAP core 12 and R-PHY node 14 is tracked, and if core clock 22 is slower than R-PHY clock 24, rate sampling module 85 adds samples on occasion to expand its sample rate to match with R-PHY node 14. In an example embodiment, the added samples have zero magnitude; in another example embodiment, the added samples are interpolated from neighboring samples.

In various embodiments, A/D 104 digitizes the signal spectrum and mixes down a portion (e.g., 2 MHz in a 0-130 MHz) of the spectrum to base band. Rate shaping module 85 may add or puncture samples at the output of A/D 104 in base band (after mixing). Subsequently, packetize module 106 may filter and packetize onto separate wires as DEPI packets and send them out to various R-PHY nodes 14.

Each R-PHY node 14 includes a de-packetize module 108, a buffer 110 and a digital-to-analog converter (D/A) 112. The samples are extracted at de-packetize module 108, up-converted (e.g., to original frequency) and stored in buffer 110 after combining with DOCSIS data. D/A 112 converts digital samples to analog and transmits them over coaxial cables to various CMs 18. In some embodiments, the transmission rate out of R-PHY node 14 may not exactly match the signal receipt rate into R-PHY node 14, for example, due to lack of clock synchronization between core clock 22 and R-PHY node 24. As a result, buffer 110 may overflow or be inefficiently utilized, and the rate of samples transmitted to R-PHY node 14 may be slowed down, or speeded accordingly.

Assume, merely for example purposes, that the frequency offset between core clock 22 and R-PHY clock 24 is 10 ppm, with ±5 ppm clock accuracy. The sample puncturing and/or addition rate can be one sample every 100 k samples in an example scenario. If the sample length is 1.3 µs (0.772 Ms/s), the sample shaping rate can be one sample for every 0.13 second. The sample puncturing and/or addition may have negligible impact on NDF signal integrity. In an example scenario, puncturing out or adding one sample for every 100 k samples may cause a spur of 57 dB below the signal. Moreover, if the NDF (OOB) signal symbol is ~1 Msps, whereas the ADC clock rate is 409.6 Msps or higher, each ADC sample occupies less than 1/400 of NDF signal symbol. Simulation results indicate that the impact on signal integrity can be negligible.

Figure 10:
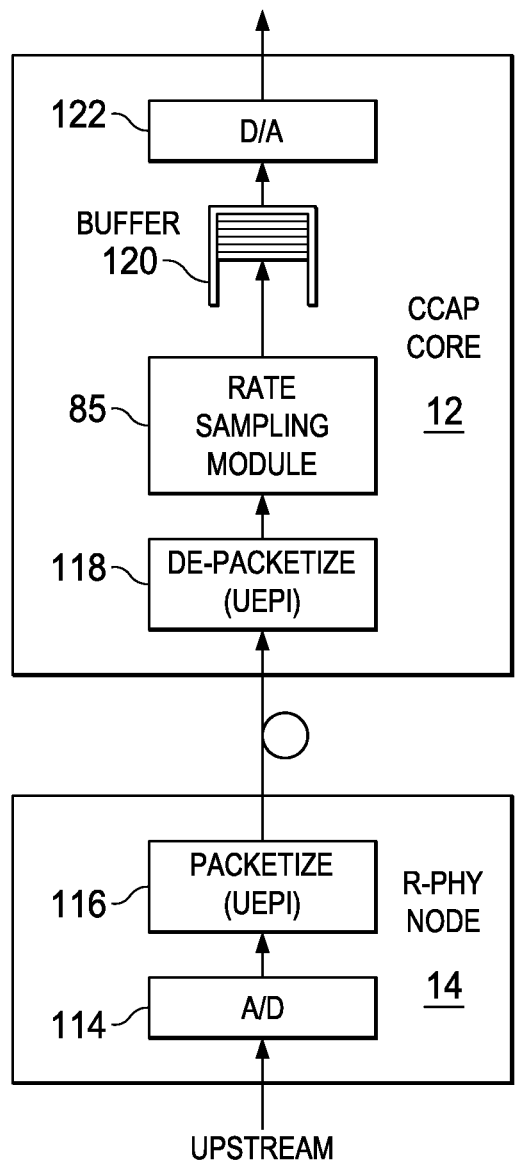
FIG. 10 is a simplified block diagram illustrating yet other example details of embodiments of the communication system.

Turning to FIG. 10, FIG. 10 is a simplified block diagram illustrating example details according to an embodiment of communication system 10. Example R-PHY node 14 include an A/D 114, and a packetize module 116 (Upstream External PHY interface (UEPI)). Example CCAP core 12 includes a de-packetize module 118, rate sampling module 85, a buffer 120 and a D/A 122. Narrowband digital return (NDR) digitizes an analog portion of the upstream spectrum at R-PHY node 14, sending the digital samples as payload in UEPI packets to CCAP Core 12, and then re-creating the original analog stream at the head-end CCAP core 12. Buffer 120 at CCAP core 12 for NDR may underflow or overflow due to the clock rate difference between CCAP core 12 and R-PHY node 14.

In various embodiments, underflow and/or overflow can be tackled as a part of buffer management. For example, if underflow occurs, rate sampling module 85 may pad a sample with zero bits (e.g., pad zero bits that consist of a completed sample). On the other hand, if overflow occurs, rate shaping module 85 may drop (e.g., puncture) a sample (e.g., drop all bits of the sample). In some embodiments, the padding and/or puncturing may be spread out evenly (e.g., 1 sample for every 10 k samples). Similar to NDF sample puncturing/addition, dropping and padding samples may have negligible effects on NDR signal.

Figure 11:
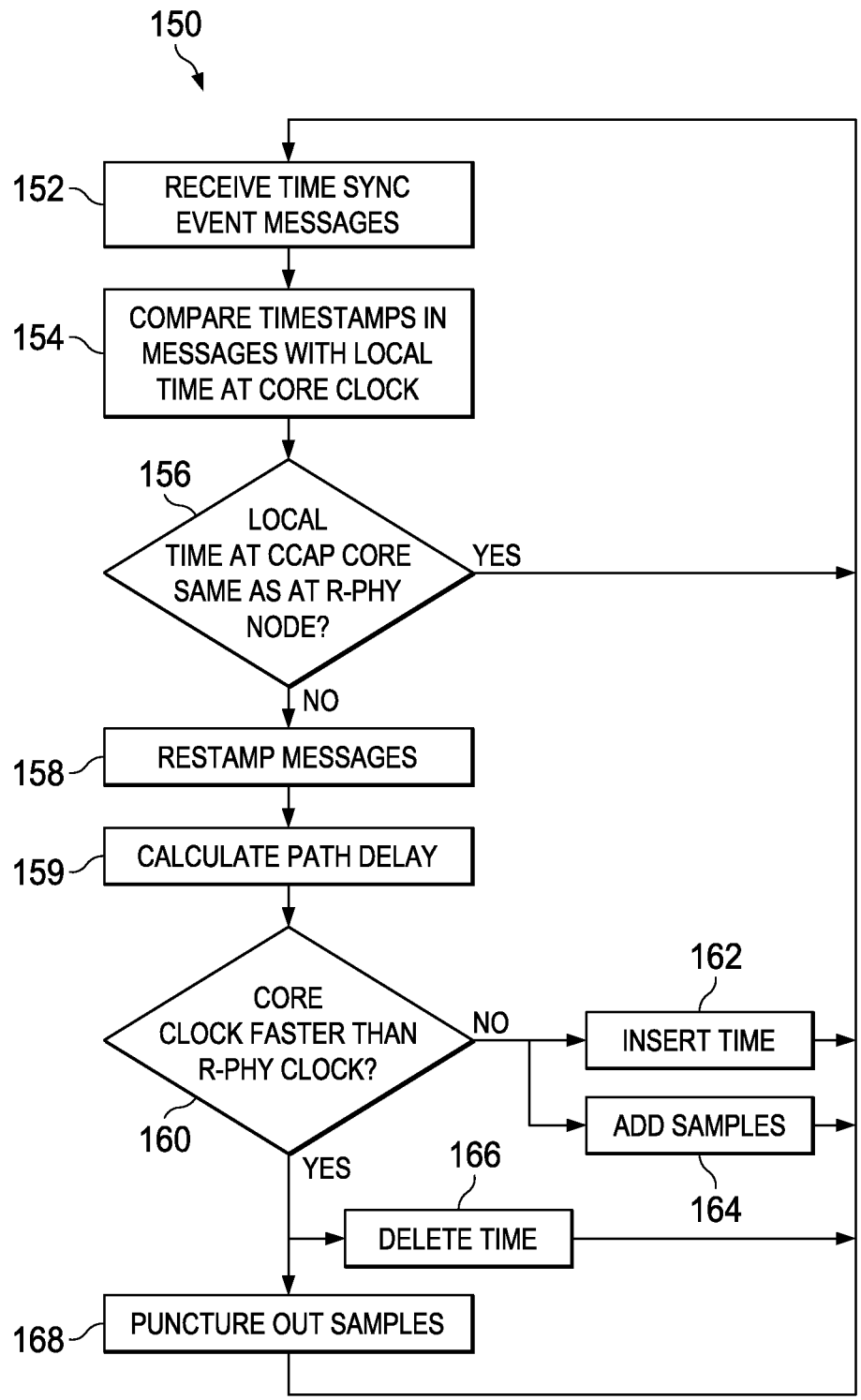
FIG. 11 is a simplified flow diagram illustrating other example operations that may be associated with an embodiment of the communication system.

Turning to FIG. 11, FIG. 11 is a simplified flow diagram illustrating example operations 150 that may be associated with embodiments of communication system 10. Operations 150 may be associated with any one clock domain island 74 generated in timing module 26 at CCAP core 12. Similar such operations may be executed for each clock domain island 74 in timing module 26 corresponding to different clock domains associated with R-PHY clocks 24 acting as master modules 28 in network 11. At 152, timing module 26 may receive time sync messages 30 at slave module 32 in CCAP core 12 corresponding to master module 28 in R-PHY node 14 associated with a specific clock domain in network 11. At 154, time re-stamp module 80 may compare timestamps in time sync messages 30 with local time at core clock 22. At 156, a determination may be made if the local time at CCAP core 12 is the same as that at R-PHY node 14. If so, the operations revert to 152. Otherwise, if the local time at CCAP core 12 is different from the local time at R-PHY node 14, at 158, time re-stamp module 80 may re-stamp other event messages (e.g., MAP messages). At 159, a mean path delay may be calculated.

At 160, a determination may be made whether core clock 22 is faster than R-PHY clock 24. If core clock 22 is slower than R-PHY clock 24, at 162, time insertion module 82 may insert time in (e.g., hasten) downstream transmissions (e.g., MAP messages) from CCAP core 12. Moreover, at 164, based on particular needs, sample add module 86 may add samples to NDF transmissions from CCAP core 12. On the other hand, at 160, if core clock 22 is faster than R-PHY clock 24, at 166, time deletion module 84 may delete time from (e.g., delay) downstream transmissions (e.g., short MAP messages) from CCAP core 12. Moreover, at 168, based on particular needs, sample puncture module 88 may puncture out samples from NDF transmissions from CCAP core 12. The operations may revert to 152, and continue thereafter in a substantially continuous mode.

Figure 12:
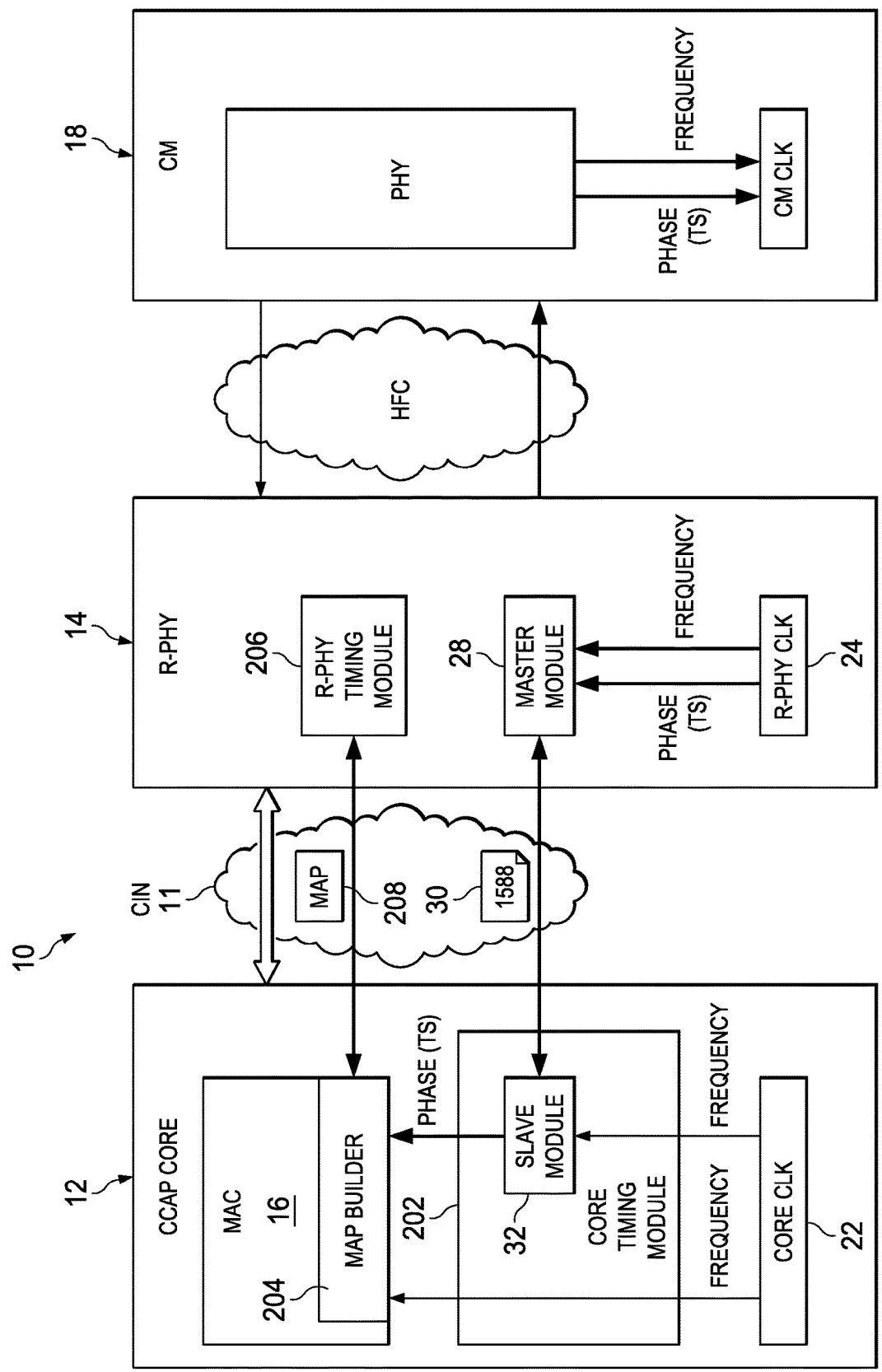
FIG. 12 is a simplified block diagram illustrating yet other example details of embodiments of the communication system.

Turning to FIG. 12, FIG. 12 is a simplified block diagram illustrating example details of another embodiment of communication system 10. According to some embodiments, CCAP core R-PHY node 14 includes a core timing module 202 and a modified MAP builder 204. R-PHY node 14 includes a separate R-PHY timing module 206. R-PHY node 14 may determine local time at core clock 22. In some embodiments, the determination may be based on remote DOCSIS timing interface or IEEE 1588 time sync messages 30. In other embodiments, the determination may be based on core timing module 202 sending a timestamp to R-PHY node 14.

In some embodiments, core timing module 202 measures frequency drift between core clock 22 and R-PHY clock 24 from timestamps received at CCAP core 12 from R-PHY node 14. Core timing module 202 may filter the timestamp and compare it to its local timestamp over a preconfigured period of time. In other embodiments, R-PHY timing module 206 filters the timestamp it gets from CCAP core 12 and compares the filtered timestamp to its local timestamp over a preconfigured period of time. In yet other embodiment, core timing module 202, and/or R-PHY timing module 206 may measure a secondary effect of clock drift, for example, manifested in MAP advance time or request grant (REQ-GNT) time, to determine the frequency drift between core clock 22 and R-PHY clock 24.

After CCAP core 12 and R-PHY node 14 approximately synchronizes respective times, MAP builder 204 at CCAP core 12 may send one or more MAP messages 208 to CM 18 through R-PHY node 14. R-PHY timing module 206 re-stamps MAP messages 208, for example, to maintain round trip accuracy from R-PHY node 14 to CM 18. The re-stamping would replace any timestamp inserted by CCAP core 12 with a timestamp corresponding to local time of R-PHY clock 24. Because core clock 22 and R-PHY clock 24 are physically separate and independent clocks, there may be clock drift between core clock 22 and R-PHY clock 24. In various embodiments, CCAP core 12 constructs MAP messages 208 to facilitate adding or deleting sections thereof by R-PHY node 14. In an example embodiment, one or more mini-slots may be added or deleted from MAP messages 208. In another example embodiments, one or more frames may be added or deleted from MAP messages 208. For example, MAP builder 204 may build a MAP message 208 with a blank mini-slot at the end thereof. There would be no data transmitted during the blank mini-slot.

In various embodiments, the blank mini-slot may be marked in a manner recognizable by R-PHY node 14. In an example embodiment, a reserved security parameter index (SPI) value that has been separately declared or negotiated between CCAP core 12 and R-PHY node 14 may be used to mark the blank mini-slot. When the marked mini-slot is received at R-PHY node 14, R-PHY timing module 206 may either delete it or add an additional mini-slot at the blank mini-slot. Adding or deleting the mini-slot can result in changes to mapping of time to symbols. The round trip delay for REQ-GNT messages and effective MAP advance time may be increased or decreased as a result.

In some embodiments, areas in MAP messages 208 where mini-slots may be added or deleted may be referred to as "stitch points." Each stitch point corresponds to areas in MAP messages 208 where MAP informational elements (IEs) could be added or deleted. In some embodiments, the entire MAP message may be added or deleted. For deleting, CCAP core 12 may occasionally provide a short MAP corresponding to a unit of time that can be deleted. R-PHY node 14 may delete the short MAP based on the time difference between core clock 22 and R-PHY node 14. For adding, R-PHY node 14 may increase a size of a marked MAP. The marked MAP may comprise a MAP marked for potential deletion in some embodiments. In other embodiments, the marked MAP may comprise a regular MAP with an null entry at the end, to which R-PHY node 14 can add additional mini-slots.

In some embodiments, core timing module 202 may measure the clock offset; MAP builder 204 may build MAP messages 208, with instructions therein to R-PHY node 14 to add or delete mini-slots. Accordingly, R-PHY timing module 206 performs the instructed action and maps mini-slots to symbols for transmission to CM 18.

In various embodiments, the number of stitch points and length of the inserted nulls may be related to the amount of clock drift to be corrected. For example, if 1% of the MAP traffic comprises nulls or stitch points, X % of clock drift may be allowed per hour. The operations may be logically analogous to (but sufficiently different from) MPEG-TS timing where null MPEG-TS packets are added and deleted from the MPEG transport stream to account for timing differences.

According to various embodiments, the clock drift between core clock 22 and R-PHY clock 24 can be compensated by adding and/or deleting MAP IEs in a coordinated method between CCAP core 12 and R-PHY node 14. In various embodiments, the operations described herein may be less expensive than a full R-DTI implementation. In some embodiments, the operations described herein may be implemented prior to locking in a standard R-DTI procedure.

Because a typical MAP message describes the upstream bandwidth usage for a certain period of time, if the period of time described by the MAP message generated by CCAP core 12 increases by an amount greater than a desired MAP advance time expected by R-PHY node 14 by a preconfigured threshold, a MAP overrun condition occurs. If the period of time described by the MAP message generated by CCAP core 12 increases by an amount less than the desired MAP advance time expected by R-PHY node 14 by another preconfigured threshold, a MAP under-run condition occurs. In known mechanisms, if a MAP overrun condition is detected at R-PHY node 14, the MAP (or MAP IEs) may be arbitrarily discarded; if a MAP under-run condition occurs, a time gap occurs between regular grant MAP messages. Because R-PHY map re-stamping logic has no knowledge of the core scheduling criteria (e.g., service flow QoS requirement, modem timing (e.g. ranging timeout) and channel loads, etc.), and the CCAP-core scheduler, on the other hand, has no knowledge of R-PHY node 14's MAP insertion or deletion logic, any arbitrary map timing adjustment at R-PHY node 14 may have adverse service impact on upstream QoS guarantees, for example, for timing sensitive service flow types such as UGS or RTPS, and overall upstream system behavior in terms of ranging time out control and upstream throughput or load management.

Figure 13:
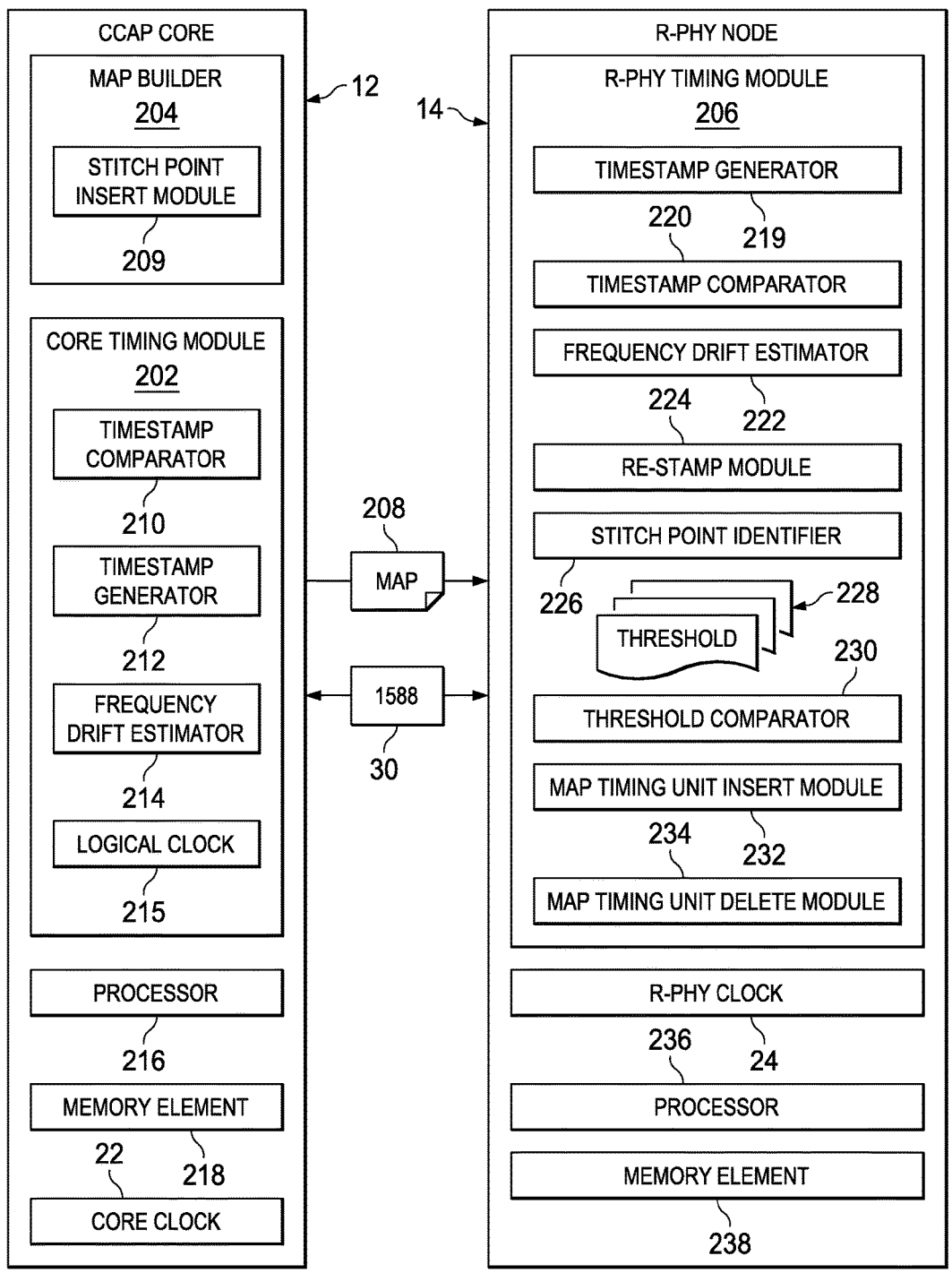
FIG. 13 is a simplified block diagram illustrating yet other example details of embodiments of the communication system.

Turning to FIG. 13, FIG. 13 is a simplified block diagram illustrating example details according to an embodiment of communication system 10. CCAP core 12 includes MAP builder 204, which includes a stitch point insert module 209. CCAP core 12 includes a core timing module 202, which includes a timestamp comparator 210, a timestamp generator 212, a frequency drift estimator 214, and a logical clock (e.g., slave clock) 215. CCAP core 12 further includes a processor 216, a memory element 218, and core clock 22.

R-PHY node 14 includes an R-PHY timing module 206, which includes a timestamp generator 219, a timestamp comparator 220, a frequency drift estimator 222, a re-stamp module 224, and a stitch point identifier 226. One or more clock drift thresholds 228 are stored in R-PHY node 14. R-PHY timing module 206 further includes a threshold comparator 230, a MAP timing unit (e.g., mini-slot or frame) insert module 232, and a MAP timing unit delete module 234. R-PHY node 14 also includes R-PHY clock 24, a processor 236, and a memory element 238.

During operation, in some embodiments, timestamp generator 219 at R-PHY node 14 may insert timestamps in time sync message 30 and send to CCAP core 12. Timestamp comparator 210 at CCAP core 12 may compare the timestamp with local clock signals from core clock 22, and adjust logical clock 215 accordingly. In other embodiments, timestamp generator 212 may insert timestamps in time sync message 30 and send to R-PHY node 14. Timestamp comparator 220 at R-PHY node 14 may compare the timestamp with local clock signals from R-PHY clock 24 to determine a time difference between core clock 22 and R-PHY clock 24. In yet other embodiments, frequency drift estimator 214 at CCAP core 12 or frequency drift estimator 222 at R-PHY node 14 may determine frequency drift between core clock 22 and R-PHY clock 24 from secondary effects such as MAP advance time, etc. Logical clock 215 may duplicate (e.g., track, synchronize with, etc.) R-PHY clock 24 based on time difference calculated (e.g., determined, derived, etc.) from time sync messages 30 and other parameters.

MAP builder 204 may generate MAP messages 208 based on time at logical clock 215. Stitch point insert module 209 may insert stitch points in MAP messages 208 based on various parameters. R-PHY timing module 206 may analyze received MAP messages 208. Re-stamp module 224 may re-stamp MAP messages 208 according to clock signals of R-PHY clock 24. Stitch point identifier 226 may identify the stitch points in MAP messages 208. Threshold comparator 230 may compare the overrun or under-run conditions indicated by the clock drift with various preconfigured thresholds 228.

For example, if core clock 22 is slower than R-PHY clock 24 by $\Delta t$ every t seconds (clock drift is $-\Delta t/t$) and the period of time indicated by the MAP message is 5t, the MAP advance time expected by R-PHY node 14 may be $5*\Delta t$ greater than the period of time indicated by the MAP message. In other words, R-PHY node 14 may wait longer than it expects for the next burst by $5*\Delta t$. If $5*\Delta t$ is greater than a preconfigured threshold, an overrun condition may be indicated. MAP timing unit insert module 232 may insert MAP timing units, map the timing units to symbols and transmit to CM 18 over the HFC network.

In another example, if core clock 22 is faster than R-PHY clock 24 by $\Delta t$ every t seconds (clock drift is $\Delta t/t$) and the period of time indicated by the MAP message is 5t, the MAP advance time expected by R-PHY node 14 may be $5*\Delta t$ less than the period of time indicated by the MAP message. In other words, R-PHY node 14 may receive bursts faster than it expects by 5*Δt. If 5*Δt is greater than a preconfigured threshold, an under-run condition may be indicated. MAP timing unit delete module 234 may delete MAP timing units (e.g., NULL MAP timing units), map the timing units to symbols and transmit to CM 18 over the HFC network.

Figure 14:
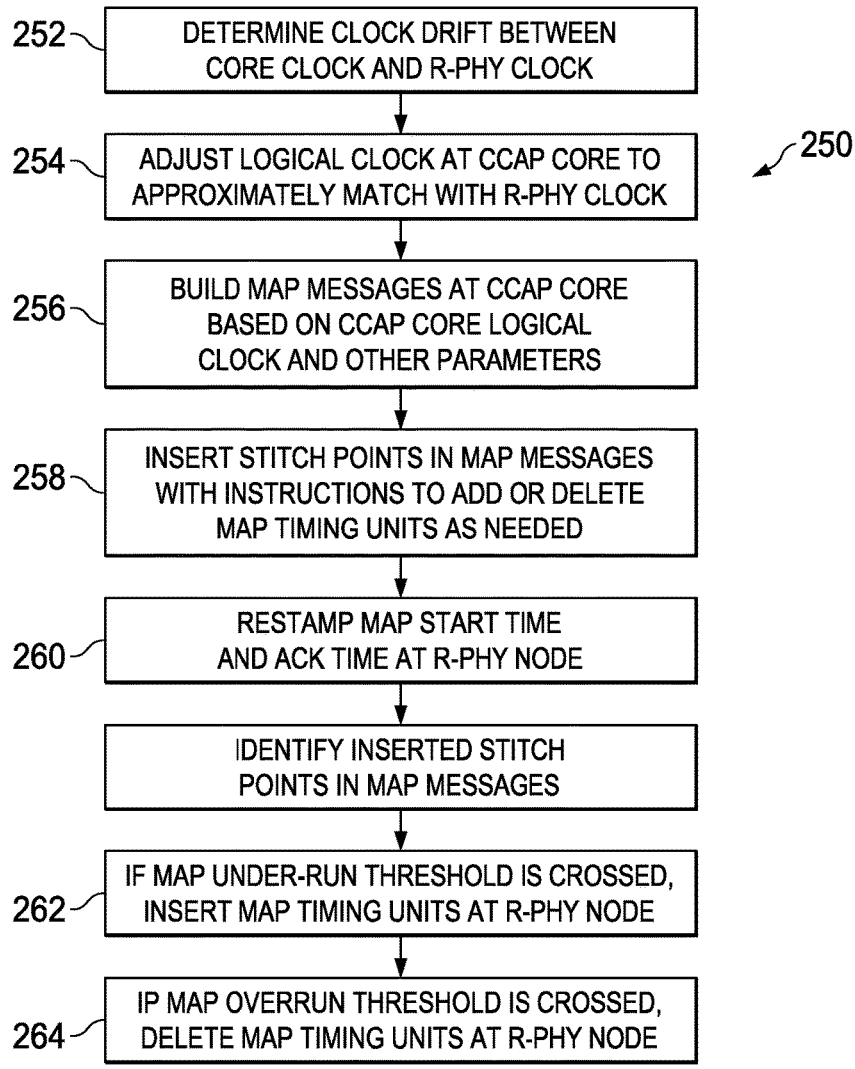
FIG. 14 is a simplified flow diagram illustrating yet other example operations that may be associated with an embodiment of the communication system.

Turning to FIG. 14, FIG. 14 is a simplified flow diagram illustrating example operations 250 according to an embodiment of communication system 10. According to various embodiments, CCAP core 12 is configured to control the MAP deletion and/or insertion operation at R-PHY node 12 by proactively allocating MAP stitch points among regular MAP grants. In an example embodiment, at 252, core timing module 202 and/or R-PHY timing module 206 determines a clock drift between core clock 22 and R-PHY clock 24. For example, timestamp comparator 210 may compare timestamp of time sync messages 30 with clock signals from core clock 22 and determine the clock drift. In another embodiment, timestamp generator 212 may generate a timestamp based on clock signals from core clock 22 and send the timestamp in time sync messages 30 to R-PHY node 14, at which timestamp comparator 220 compares the timestamp from CCAP core 12 with clock signals from R-PHY clock 24. In yet other embodiments, frequency drift estimator 214 at CCAP core 12 or frequency drift estimator 222 at R-PHY node 14 may determine frequency drift between core clock 22 and R-PHY clock 24 from secondary effects such as MAP advance time, etc. At 254, logical clock 215 at CCAP core 12 is adjusted to approximately match with R-PHY clock 24.

At 256, MAP builder 204 at CCAP core 12 builds MAP messages 208 based on CCAP core logical clock 215 (e.g., slave logical clock duplicating master R-PHY clock 24), physical layer channel configuration, and scheduling criteria for QoS, Ranging, Upstream Channel Descriptor (UCD) update, and/or other suitable parameters. At 258, stitch point insert module 209 inserts stitch points in MAP messages 208 at CCAP core 12 to instruct R-PHY node 14 to safely insert or remove NULL MAP timing units (e.g. mini-slots with NULL service identifier (SID)), based on various rules such as: the stitch point is encoded as a MAP IE with a known SID reserved for this purpose, the stitch point aligns with the MAP timing unit, mini-slot or frame in case of OFDMA or SCDMA, the stitch point is arranged after a non-NULL MAP IE and followed by a group of NULL MAP timing units that are safe be deleted, (note that the number of the NULL MAP timing units can determine a maximum step size of each timing adjustment at R-PHY node 14), the stitch point is not to be located in the middle of a grant (e.g. a grant across frame boundaries or inside an IM region, the density of the stitch points is proportional to the degree of timing inaccuracy and network jitter between CCAP core 12 and R-PHY node 14, the stitch points are evenly spaced to allow incremental corrections at RPHY to minimize MAP timing jitter variations, etc.

At 260, re-stamp module 224 at R-PHY node 14 re-stamps MAP start time and ACK time, for example, to maintain round trip accuracy with CM 18. At 262, stitch point identifier 226 identifies the inserted stitch points. At 264, threshold comparator 230 compares the clock drift with preconfigured overrun threshold and under-run threshold. If the MAP under-run threshold is crossed, MAP timing unit insert module 232 inserts one or multiple NULL MAP timing units depending on an agreed adjustment step size. At 264, if MAP overrun threshold is crossed, MAP timing unit delete module 234 deletes NULL MAP timing units as needed.

Figure 15:
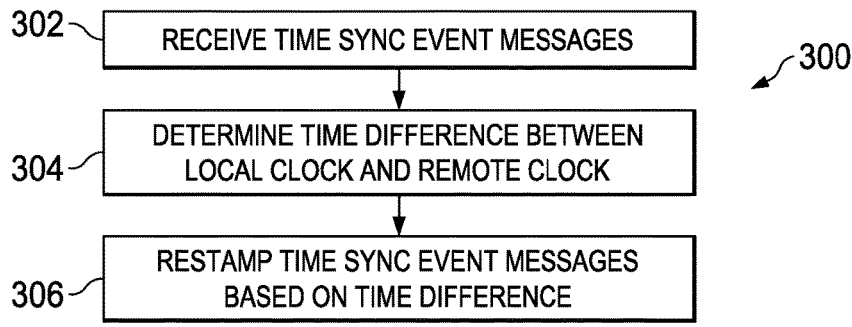
FIG. 15 is a simplified flow diagram illustrating yet other example operations that may be associated with an embodiment of the communication system.

Turning to FIG. 15, FIG. 15 is a simplified flow diagram illustrating example operations 300 that may be associated with an embodiment of communication system 10. At 302, R-PHY node 14 may receive time sync messages 30. At 304, R-PHY node 14 may determine a time difference between local R-PHY clock 24 and remote core clock 22. At 306, R-PHY node 14 may re-stamp time sync messages 30 based on the time difference.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/ perfectly efficient state.

In example implementations, at least some portions of the activities outlined herein may be implemented in software in, for example, timing module 26, core timing module 202, and R-PHY timing module 206. In some embodiments, one or more of these features may be implemented in hardware, provided external to these elements, or consolidated in any appropriate manner to achieve the intended functionality. The various components may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, timing module 26, core timing module 202, and R-PHY timing module 206 described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory elements 78, 218, 238) can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In one example, processors (e.g., processors 76, 216, 236) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
   receiving, at a first hardware device, a time synchronization message from a remote second hardware device in a Data Over Cable Service Interface Specification (DOCSIS) Remote Physical layer (R-PHY) network;
   determining a time difference between a first clock at the first hardware device and a second clock at the second hardware device from the time synchronization message;
   re-stamping an event message based on the time difference;
   receiving, at the first hardware device, a Media Access Protocol (MAP) message from the second hardware device;
   identifying a stitch point in the MAP message; and
   modifying the MAP message at the stitch point based on the time difference, wherein the modifying comprises adding a MAP timing unit at the stitch point if the clock drift indicates that an under-run threshold is crossed.

2. The method of claim 1, wherein the first hardware device comprises a Converged Cable Access Platform (CCAP) core and the second hardware device comprises a Remote Physical Layer interface (R-PHY) node, wherein the CCAP core and the R-PHY node together comprise a portion of a Cable Modem Transmission System (CMTS).

3. The method of claim 1, wherein re-stamping comprises adjusting a timestamp on the event message to match a remote time of the second clock.

4. The method of claim 1, further comprising:
   inserting time at a logical clock at the first hardware device if the first clock is slower than the second clock; and
   deleting time at the logical clock if the first clock is faster than the second clock.

5. The method of claim 1, further comprising:
   hastening downstream transmissions from the first hardware device if the first clock is slower than the second clock; and
   delaying downstream transmissions from the first hardware device if the first clock is faster than the second clock.

6. The method of claim 1, further comprising determining a frequency difference between the first clock and the second clock.

7. The method of claim 1, further comprising:
   adding samples in narrowband digital forward transmissions from the first hardware device if the first clock is slower than the second clock; and
   puncturing samples in narrowband digital forward transmissions from the first hardware device if the first clock is faster than the second clock.

8. The method of claim 7, wherein rates of puncturing of samples and addition of samples are based on the time difference.

9. The method of claim 1, further comprising:
receiving, at the first hardware device, a plurality of time synchronization messages from a plurality of remote second hardware devices in the network;
determining respective time differences between the first clock at the first hardware device and a plurality of second clocks at each of the plurality of second hardware devices from the plurality of time synchronization messages, the plurality of second clocks comprising separate clock domains; and
re-stamping a plurality of event messages based on the time differences.

10. The method of claim 9, wherein the first hardware device generates separate local clock domain islands corresponding to the separate clock domains, wherein each local clock domain island tracks the respective time difference of the corresponding separate clock domain with the local time at the first clock.

11. The method of claim 10, wherein the separate local clock domain islands hasten downstream transmissions from the first hardware device in the corresponding clock domain if the first clock is slower than the second clock associated with the corresponding clock domain, and wherein the separate local clock domain islands delay downstream transmissions from the first hardware device in the corresponding clock domain if the first clock is faster than the second clock associated with the corresponding clock domain.

12. The method of claim 1, wherein determining the time difference comprises computing network delay and clock drift from a rolling sample table.

13. The method of claim 1, wherein the first hardware device comprises a R-PHY node and the second hardware device comprises a CCAP core, wherein the CCAP core and the R-PHY node together comprise a portion of a CMTS.

14. The method of claim 1, wherein re-stamping comprises adjusting a timestamp on the event message to match a local time of the first clock.

15. The method of claim 1, wherein the modifying the MAP message comprises deleting a MAP timing unit at the stitch point if the clock drift indicates that an overrun threshold is crossed.

16. The method of claim 1, wherein the MAP message comprises a short MAP message including a timing unit that can be deleted.

17. The method of claim 1, wherein the MAP message comprises a regular MAP message including a null entry that can be added to.

18. The method of claim 1, wherein the MAP message includes a plurality of stitch points corresponding to the time difference.

19. Non-transitory tangible computer readable media that includes instructions for execution, which when executed by a processor, performs operations comprising:
receiving, at a first hardware device, a time synchronization message from a remote second hardware device in a DOCSIS R-PHY network;
determining a time difference between a first clock at the first hardware device and a second clock at the second hardware device from the time synchronization message;
re-stamping an event message based on the time difference;
receiving, at the first hardware device, a MAP message from the second hardware device;
identifying a stitch point in the MAP message; and
modifying the MAP message at the stitch point based on the time difference, wherein the modifying comprises adding a MAP timing unit at the stitch point if the clock drift indicates that an under-run threshold is crossed.

20. The media of claim 19, wherein re-stamping comprises adjusting a timestamp on the event message to match a remote time of the second clock.

21. The media of claim 19, wherein the operations further comprise:
hastening downstream transmissions from the first hardware device if the first clock is slower than the second clock; and
delaying downstream transmissions from the first hardware device if the first clock is faster than the second clock.

22. The media of claim 19, wherein the operations further comprise:
adding samples in narrowband digital forward transmissions from the first hardware device if the first clock is slower than the second clock; and
puncturing samples in narrowband digital forward transmissions from the first hardware device if the first clock is faster than the second clock.

23. The media of claim 22, wherein rates of puncturing of samples and addition of samples are based on the time difference.

24. The media of claim 19, wherein the modifying the MAP message comprises deleting a MAP timing unit at the stitch point if the clock drift indicates that an overrun threshold is crossed.

25. The media of claim 19, wherein the MAP message includes a plurality of stitch points corresponding to the time difference.

26. An apparatus, comprising:
a first hardware device including a first clock;
a memory element for storing data; and
a processor, wherein the processor executes instructions associated with the data, wherein the processor and the memory element cooperate, such that the apparatus is configured for:
receiving, at the first hardware device, a time synchronization message from a remote second hardware device in a DOCSIS R-PHY network;
determining a time difference between the first clock at the first hardware device and a second clock at the second hardware device from the time synchronization message;
re-stamping an event message based on the time difference;
receiving, at the first hardware device, a MAP message from the second hardware device;
identifying a stitch point in the MAP message; and
modifying the MAP message at the stitch point based on the time difference, wherein the modifying comprises adding a MAP timing unit at the stitch point if the clock drift indicates that an under-run threshold is crossed.

27. The apparatus of claim 26, wherein re-stamping comprises adjusting a timestamp on the event message to match a remote time of the second clock.

28. The apparatus of claim 26, further configured for:
hastening downstream transmissions from the first hardware device if the first clock is slower than the second clock; and
delaying downstream transmissions from the first hardware device if the first clock is faster than the second clock.

29. The apparatus of claim 26, further configured for:
adding samples in narrowband digital forward transmissions from the first hardware device if the first clock is slower than the second clock; and
puncturing samples in narrowband digital forward transmissions from the first hardware device if the first clock is faster than the second clock.

30. The apparatus of claim 29, wherein rates of puncturing of samples and addition of samples are based on the time difference.

31. The apparatus of claim 26, wherein the modifying the MAP message comprises deleting a MAP timing unit at the stitch point if the clock drift indicates that an overrun threshold is crossed.

32. The apparatus of claim 26, wherein the MAP message includes a plurality of stitch points corresponding to the time difference.

\* \* \* \* \*